(12) United States Patent
Wu et al.

(10) Patent No.: US 10,575,149 B2
(45) Date of Patent: Feb. 25, 2020

(54) METHODS TO ENABLE EFFICIENT INTRA-PLATOON COMMUNICATION

(71) Applicant: QUALCOMM Incorporated, San Diego, CA (US)

(72) Inventors: Zhibin Wu, Bedminster, NJ (US); Shailesh Patil, San Diego, CA (US); Sudhir Kumar Baghel, Hillsborough, NJ (US); Libin Jiang, Bridgewater, NJ (US); Junyi Li, Chester, NJ (US); Kapil Gulati, Dover, DE (US); Tien Viet Nguyen, Bedminster, NJ (US); Georgios Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 15/920,401

(22) Filed: Mar. 13, 2018

(65) Prior Publication Data
US 2018/0279096 A1 Sep. 27, 2018

(30) Foreign Application Priority Data
Mar. 23, 2017 (GR) .............................. 20170100115

(51) Int. Cl.
*H04W 4/40* (2018.01)
*H04L 5/00* (2006.01)
(Continued)

(52) U.S. Cl.
CPC ............... *H04W 4/40* (2018.02); *G08G 1/22* (2013.01); *H04L 5/0007* (2013.01);
(Continued)

(58) Field of Classification Search
CPC .......... H04W 4/40; H04W 4/08; H04W 4/46; H04W 72/121; H04W 72/044;
(Continued)

(56) References Cited

U.S. PATENT DOCUMENTS 9,723,457 B2 * 8/2017 Brahmi ............. H04W 72/0406
9,786,182 B2 * 10/2017 Calmettes ................ G08G 1/22
(Continued)

FOREIGN PATENT DOCUMENTS

WO WO-2016038164 A1 3/2016
WO WO-2018021784 A1 * 2/2018 ............ H04W 72/02

OTHER PUBLICATIONS

International Search Report and Written Opinion—PCT/US2018/024498—ISA/EPO—dated Jul. 17, 2018.

*Primary Examiner* — Brian T O Connor
(74) *Attorney, Agent, or Firm* — Holland & Hart LLP

(57) ABSTRACT

Methods, systems, and devices for wireless communication are described. A user equipment (UE), e.g., a lead platooning vehicle configured for wireless communications, may determine a communication resource requirement for a group of platooning vehicles. The communication resource requirement may be based at least in part on a number of vehicles forming the group of platooning vehicles and a communication range of at least a portion of the vehicles. The UE may identify, based at least in part on the identified communication resource requirement, an assignment of time-frequency radio resources to use for inter-vehicle communications in the group of platooning vehicles. The UE may transmit an indication of the assignment of time-frequency radio resources to the group of platooning vehicles.

30 Claims, 13 Drawing Sheets

(51) Int. Cl.

| | |
|---|---|
| *H04W 72/04* | (2009.01) |
| *H04W 72/12* | (2009.01) |
| *H04W 4/46* | (2018.01) |
| *G08G 1/00* | (2006.01) |
| *H04W 4/08* | (2009.01) |

(52) U.S. Cl.
CPC ............. *H04L 5/0037* (2013.01); *H04W 4/08* (2013.01); *H04W 4/46* (2018.02); *H04W 72/044* (2013.01); *H04W 72/121* (2013.01); H04L 5/0005 (2013.01); *H04W 72/1278* (2013.01)

(58) Field of Classification Search
CPC ............. H04W 72/1278; H04L 5/0037; H04L 5/0007; H04L 5/0005; G08G 1/22
See application file for complete search history.

(56) References Cited

U.S. PATENT DOCUMENTS

| | | | |
|---|---|---|---|
| 9,798,329 B2* | 10/2017 | Shattil | B64C 39/024 |
| 10,194,264 B2* | 1/2019 | Azevedo | H04W 40/00 |
| 2016/0212596 A1 | 7/2016 | Brahmi et al. | |
| 2017/0069214 A1* | 3/2017 | Dupray | G08G 5/0021 |
| 2018/0039287 A1* | 2/2018 | Shattil | B64C 39/024 |
| 2018/0063825 A1* | 3/2018 | Van Phan | H04W 52/0216 |
| 2018/0287696 A1* | 10/2018 | Barbieri | H04B 7/15507 |
| 2019/0020987 A1* | 1/2019 | Khoryaev | H04W 4/46 |
| 2019/0150157 A1* | 5/2019 | Panteleev | H04W 72/0486 |

* cited by examiner

METHODS TO ENABLE EFFICIENT INTRA-PLATOON COMMUNICATION

CROSS REFERENCES

The present application for patent claims priority to Greece Patent Application No. 20170100115 by WU, et al., entitled "Methods To Enable Efficient Intra-Platoon Communication," filed Mar. 23, 2017, assigned to the assignee hereof.

INTRODUCTION

The following relates generally to wireless communication, and more specifically to methods to enable efficient intra-platoon communication.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless communication systems may include or support networks used for vehicle based communications, also referred to as vehicle-to-everything (V2X) networks, vehicle-to-vehicle (V2V) networks, and/or cellular V2X (C-V2X) networks. Vehicle based communication networks may provide always on telematics where UEs, e.g., vehicle UEs (v-UEs), communicate directly to the network (V2N), to pedestrian UEs (V2P), to infrastructure devices (V2I), and to other v-UEs (e.g., via the network and/or directly). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

One example of such vehicle based communication networks may support platooning, which coordinates the movement of a group of vehicles to reduce the inter-vehicle distance, improve lane capacity, reduce drag/increase fuel efficiency, and the like. To maintain the stability of the vehicle-following behaviors, e.g., to keep constant spacing between platooning vehicles, a vehicle in the platoon typically sends its own position/location, speed, acceleration, and other such information to its adjacent vehicles. A vehicle may also share this information to the other vehicles in the platoon of vehicles to help stabilize the platoon of vehicles. Such intra-platoon (or inter-vehicle) communications are wireless communication with radio resources, which needs to be managed efficiently to avoid interference and collision.

SUMMARY

A method of for wireless communication is described. The method may include determining a communication resource requirement for a group of platooning vehicles, the communication resource requirement based at least in part on a number of vehicles forming the group of platooning vehicles and a communication range of at least a portion of the vehicles, identifying, based at least in part on the identified communication resource requirement, an assignment of time-frequency radio resources to use for inter-vehicle communications in the group of platooning vehicles, and transmitting an indication of the assignment of time-frequency radio resources to the group of platooning vehicles.

An apparatus for wireless communication is described. The apparatus may include means for determining a communication resource requirement for a group of platooning vehicles, the communication resource requirement based at least in part on a number of vehicles forming the group of platooning vehicles and a communication range of at least a portion of the vehicles, means for identifying, based at least in part on the identified communication resource requirement, an assignment of time-frequency radio resources to use for inter-vehicle communications in the group of platooning vehicles, and means for transmitting an indication of the assignment of time-frequency radio resources to the group of platooning vehicles.

Another apparatus for wireless communication is described. The apparatus may include a processor, memory in electronic communication with the processor, and instructions stored in the memory. The instructions may be operable to cause the processor to determine a communication resource requirement for a group of platooning vehicles, the communication resource requirement based at least in part on a number of vehicles forming the group of platooning vehicles and a communication range of at least a portion of the vehicles, identify, based at least in part on the identified communication resource requirement, an assignment of time-frequency radio resources to use for inter-vehicle communications in the group of platooning vehicles, and transmit an indication of the assignment of time-frequency radio resources to the group of platooning vehicles.

A non-transitory computer readable medium for wireless communication is described. The non-transitory computer-readable medium may include instructions operable to cause a processor to determine a communication resource requirement for a group of platooning vehicles, the communication resource requirement based at least in part on a number of vehicles forming the group of platooning vehicles and a communication range of at least a portion of the vehicles, identify, based at least in part on the identified communication resource requirement, an assignment of time-frequency radio resources to use for inter-vehicle communications in the group of platooning vehicles, and transmit an indication of the assignment of time-frequency radio resources to the group of platooning vehicles.

Some examples of the method, apparatus, and non-transitory computer-readable medium described above may further include processes, features, means, or instructions for determining a communication schedule for the group of platooning vehicles, the communication schedule comprising assigning at least a portion of the time-frequency radio resources to different vehicles. Some examples of the method, apparatus, and non-transitory computer-readable medium described above may further include processes, features, means, or instructions for transmitting an indication of the communication schedule to the group of platooning vehicles.

Some examples of the method, apparatus, and non-transitory computer-readable medium described above may further include processes, features, means, or instructions for obtaining communications, according to the communications schedule and using at least a portion of the assigned time-frequency radio resources, from the vehicles of the group of platooning vehicles.

Some examples of the method, apparatus, and non-transitory computer-readable medium described above may further include processes, features, means, or instructions for assigning a sequential identifier to each vehicle in the group of platooning vehicles according to the order in which the vehicle may be located within the group of platooning vehicles.

Some examples of the method, apparatus, and non-transitory computer-readable medium described above may further include processes, features, means, or instructions for assigning, according to the sequential identifiers, a first subset of time-frequency radio resources to a first group of vehicles and a second subset of time-frequency radio resources to a second group of vehicles, the first subset of time-frequency radio resources being non-overlapping in time and may be overlapping in frequency with respect to the second subset of time-frequency radio resources.

Some examples of the method, apparatus, and non-transitory computer-readable medium described above may further include processes, features, means, or instructions for determining a number of frequency channels for the communication resource requirement based at least in part on the number of vehicles and the communication range of the portion of vehicles.

In some examples of the method, apparatus, and non-transitory computer-readable medium described above, the first group of vehicles may be associated with odd numbered sequential identifier and the second group of vehicles may be associated with even numbered sequential identifiers.

Some examples of the method, apparatus, and non-transitory computer-readable medium described above may further include processes, features, means, or instructions for transmitting a resource request message to a base station, the resource request message conveying an indication of the identified resource requirement. Some examples of the method, apparatus, and non-transitory computer-readable medium described above may further include processes, features, means, or instructions for receiving a resource assignment message from the base station, the resource assignment message conveying an assignment of the time-frequency radio resources.

Some examples of the method, apparatus, and non-transitory computer-readable medium described above may further include processes, features, means, or instructions for identifying a pre-configured resource pool available to use in the group of platooning vehicles. Some examples of the method, apparatus, and non-transitory computer-readable medium described above may further include processes, features, means, or instructions for selecting, from the pre-configured resource pool, the assignment of the time-frequency radio resources.

In some examples of the method, apparatus, and non-transitory computer-readable medium described above, the communication resource requirement may be further based on a travel speed of the group of platooning vehicles, a distance between the vehicles in the group of platooning vehicles, a resource block size used for the inter-vehicles communications, or combinations thereof.

In some examples of the method, apparatus, and non-transitory computer-readable medium described above, the time-frequency radio resources comprise using a licensed radio frequency spectrum band, an unlicensed radio frequency spectrum band, or combinations thereof.

A method of for wireless communication is described. The method may include determining a sequential identifier of a vehicle within a group of platooning vehicles, the sequential identifier based on an order of the vehicle within the group of platooning vehicles, identifying a set of time-frequency radio resources associated with inter-vehicle communications within the group of platooning vehicles, selecting a subset of the time-frequency radio resources to use for the inter-vehicle communications, the subset of time-frequency radio resource being based at least in part on the sequential identifier of the vehicle, a number of vehicles in the group of platooning vehicles, a communication range of at least a portion of the vehicles, or a combination thereof, and performing inter-vehicle communications using the selected subset of time-frequency radio resources.

An apparatus for wireless communication is described. The apparatus may include means for determining a sequential identifier of a vehicle within a group of platooning vehicles, the sequential identifier based on an order of the vehicle within the group of platooning vehicles, means for identifying a set of time-frequency radio resources associated with inter-vehicle communications within the group of platooning vehicles, means for selecting a subset of the time-frequency radio resources to use for the inter-vehicle communications, the subset of time-frequency radio resource being based at least in part on the sequential identifier of the vehicle, a number of vehicles in the group of platooning vehicles, a communication range of at least a portion of the vehicles, or a combination thereof, and means for performing inter-vehicle communications using the selected subset of time-frequency radio resources.

Another apparatus for wireless communication is described. The apparatus may include a processor, memory in electronic communication with the processor, and instructions stored in the memory. The instructions may be operable to cause the processor to determine a sequential identifier of a vehicle within a group of platooning vehicles, the sequential identifier based on an order of the vehicle within the group of platooning vehicles, identify a set of time-frequency radio resources associated with inter-vehicle communications within the group of platooning vehicles, select a subset of the time-frequency radio resources to use for the inter-vehicle communications, the subset of time-frequency radio resource being based at least in part on the sequential identifier of the vehicle, a number of vehicles in the group of platooning vehicles, a communication range of at least a portion of the vehicles, or a combination thereof, and perform inter-vehicle communications using the selected subset of time-frequency radio resources.

A non-transitory computer readable medium for wireless communication is described. The non-transitory computer-readable medium may include instructions operable to cause a processor to determine a sequential identifier of a vehicle within a group of platooning vehicles, the sequential identifier based on an order of the vehicle within the group of platooning vehicles, identify a set of time-frequency radio resources associated with inter-vehicle communications within the group of platooning vehicles, select a subset of the time-frequency radio resources to use for the inter-vehicle communications, the subset of time-frequency radio resource being based at least in part on the sequential identifier of the vehicle, a number of vehicles in the group of platooning vehicles, a communication range of at least a portion of the vehicles, or a combination thereof, and perform inter-vehicle communications using the selected subset of time-frequency radio resources.

Some examples of the method, apparatus, and non-transitory computer-readable medium described above may further include processes, features, means, or instructions for receiving a broadcast message from a lead vehicle in the group of platooning vehicles, the broadcast message conveying an indication of the time-frequency radio resources.

In some examples of the method, apparatus, and non-transitory computer-readable medium described above, the broadcast message further conveying an indication of the subset of time-frequency radio resources.

Some examples of the method, apparatus, and non-transitory computer-readable medium described above may further include processes, features, means, or instructions for identifying a pre-configured resource pool available to use in the group of platooning vehicles. Some examples of the method, apparatus, and non-transitory computer-readable medium described above may further include processes, features, means, or instructions for selecting, from the pre-configured resource pool and based on the sequential identifier, the subset of time-frequency radio resources.

Some examples of the method, apparatus, and non-transitory computer-readable medium described above may further include processes, features, means, or instructions for determining the sequential identifier based at least in part on receiving the sequential identifier from a base station, or determining the sequential identifier based at least in part on information received from a lead vehicle of the group of platooning vehicles, or combinations thereof.

Some examples of the method, apparatus, and non-transitory computer-readable medium described above may further include processes, features, means, or instructions for sharing the subset of time-frequency radio resources with at least one other vehicle, the sharing being based on a communication range of the other vehicle, a number of vehicles forming the group of platooning vehicles, a spacing between vehicles in the group of platooning vehicles, a travel speed of the group of platooning vehicles, or combinations thereof.

In some examples of the method, apparatus, and non-transitory computer-readable medium described above, the subset of time-frequency radio resources may be time division multiplexed with time-frequency radio resources used for inter-vehicle communications by each vehicle located adjacent to the vehicle.

DETAILED DESCRIPTION

Figure 1:
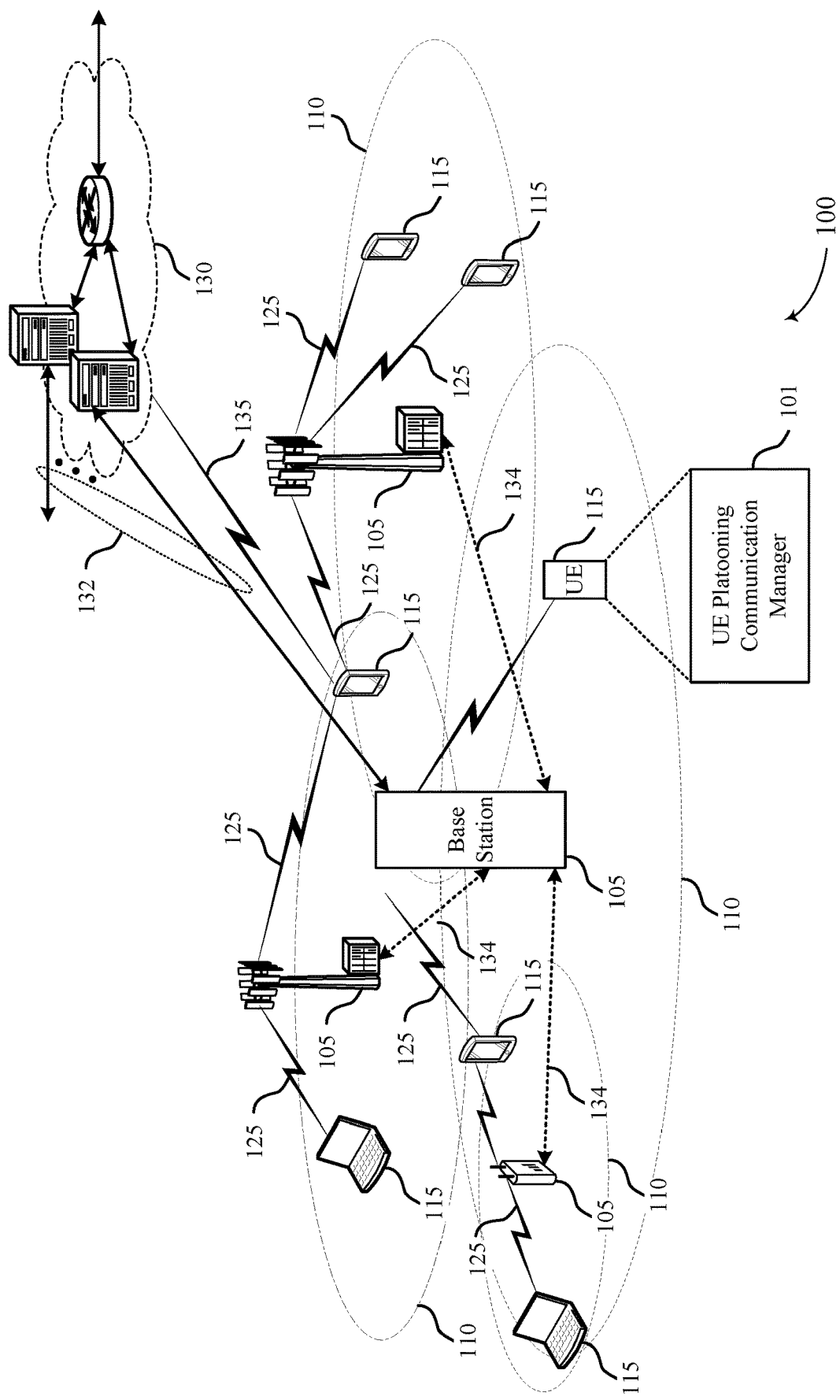
FIG. 1 illustrates an example of a system for wireless communication that supports methods to enable efficient intra-platoon communication, in accordance with one or more aspects of the present disclosure.

Platooning is a technology that coordinates the movement of a group of vehicles (the group of platooning vehicles) to manage the separation of the vehicles, to manage vehicle speeds, and the like. Groups of platooning vehicles may be formed on an ad-hoc basis depending on V2V information exchanged between the vehicles, V2X information exchanged between the vehicles and the base station/network, and the like. For example, a platoon of vehicles may be dynamically formed whenever a certain number of vehicles are traveling in the same direction (e.g., in the same or adjacent lanes of traffic), at roughly the same speed, and so on in order to achieve certain advantages, e.g., improved fuel efficiency, manage traffic flow, improve collision avoidance, etc. Moreover, vehicles may leave the platoon and/or be added to the group of platooning vehicles as needed. Coordination of the group of platooning vehicles may use wireless communications, such a V2V, V2X, V2I, etc.

Certain considerations when using wireless communication is that a UE (e.g., a vehicle in a group of platooning vehicles) may not support full-duplex communications, the hidden node problem where transmissions cause interference at an unintended receiver, etc. Aspects of the described techniques generally address such concerns and provide efficient intra-platoon (e.g., inter-vehicle) communications.

Aspects of the disclosure are initially described in the context of a wireless communication system. Generally, a platoon of vehicles forms a string topology, e.g., the vehicles are traveling in order down a road. Aspect(s) of the present disclosure generally assign a sequential identifier (e.g., a vehicle identifier (VID)) such as 1, 2, 3, 4, and so on) to each vehicle in the group of platooning vehicles. In some aspects, vehicles with an odd numbered VID (e.g., VID=1, VID=3, etc.) may use time-division multiplexing (TDM) with vehicles with an even numbered VID (e.g., VID=2, VID=4, etc.). Thus, odd-numbered VIDs may perform inter-vehicle communications during a first time period, a third time period, etc., and the even-numbered VIDs may perform inter-vehicle communications during a second time period, a fourth time period, etc. Further, within the even and odd numbered VIDs, vehicles may use frequency-division multiplexing (FDM) to avoid interference from other vehicles within the platoon. For example, VID=1 may use a first frequency, VID=3 may use a second frequency, VID=5 may use a third frequency, and so on, during their scheduled transmission periods. Similarly, VID=2 may use the first frequency, VID=4 may use the second frequency, etc., during their scheduled transmission periods.

In some aspects, the lead vehicle may manage, control, etc., aspects of the described techniques for inter-vehicle communications. For example, the lead vehicle may determine that it is the first vehicle in the group of platooning vehicles, the number of vehicles traveling within the platoon, what the communication range is for some or all of the vehicles in the platoon, etc. The lead vehicle may use this information to determine what communication resources are required for the platoon, e.g., the number of frequencies or channels, the duration of the transmission periods, etc. The lead vehicle may use the communication requirements to identify time-frequency resource that are available for use by the platoon of vehicles (e.g., based on pre-configured resource information and/or assignments received from a base station). The lead vehicle may transmit information to the vehicles in the platoon indicative of the assigned time-frequency resources.

In some aspects, the lead vehicle may actually identify the communication schedule for the group of platooning vehicles and convey such information in the transmission. In other examples, a vehicle (or all of the vehicles) in the platoon may independently determine the communication schedule. For example, the vehicle may determine its sequential identifier (e.g., VID) and identify time-frequency resources available for the platoon of vehicles (e.g., based on information received from the lead vehicle, base station, and/or pre-configured information). The vehicle may use its VID and the available time-frequency resources to select a subset of time-frequency resource to use for inter-vehicle communications. The subset of time-frequency resource may include resources based on the described TDM and/or FDM schemes where the transmission period and frequency are selected based on the VID of the vehicle.

Aspects of the disclosure are further illustrated by and described with reference to apparatus diagrams, system diagrams, and flowcharts that relate to methods to enable efficient intra-platoon communication.

FIG. 1 illustrates an example of a wireless communication system 100, in accordance with one or more aspects of the present disclosure. The wireless communication system 100 includes base stations 105 (e.g., next generation NodeBs (gNodeBs or gNBs)), UEs 115, and a core network 130. In some examples, the wireless communication system 100 may be a Long Term Evolution (LTE), LTE-Advanced (LTE-A) network, or a NR network. In some cases, wireless communication system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communication system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using TDM techniques, FDM techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like. In some aspects, UEs 115 may also communication with core network through communication links 135.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105. Another example of direct UE-115 communications may include V2X and/or V2V communications. Thus, references to a vehicle may refer to a UE 115 where the vehicle is equipped to perform wireless communications using the described techniques.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communication system may be configured to provide ultra-reliable communications for these functions. MTC devices may be another example of a vehicle (e.g., a vehicle configured or otherwise supporting wireless communications).

Base stations 105 may communicate with the core network 130 and with one another. For example, base stations 105 may interface with the core network 130 through backhaul links 132 (e.g., S1, etc.). Base stations 105 may communicate with one another over backhaul links 134

(e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105, may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

In some cases, the antennas of a base station 105 or UE 115 may be located within one or more antenna arrays, which may support beamforming or multiple-input/multiple-output (MIMO) operations. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat/Request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, network device, or core network 130 supporting radio bearers for user plane data. At the Physical (PHY) layer, transport channels may be mapped to physical channels.

Time intervals in LTE or NR may be expressed in multiples of a basic time unit. Time resources may be organized according to radio frames, which may be identified by a system frame number (SFN). Each frame may include ten 1 ms subframes numbered from 0 to 9, in some examples. A subframe may be further divided into two 0.5 ms slots, each of which contains 6 or 7 modulation symbol periods (depending on the length of the cyclic prefix prepended to each symbol). Excluding the cyclic prefix, each symbol may contain 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

In some cases, an enhanced component carrier (eCC) may utilize a different symbol duration than other component carriers (CCs), which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Wireless communication systems may include or support networks used for vehicle based communications, also referred to as V2X networks, V2V networks, and/or cellular V2X (C-V2X) networks. Vehicle based communication networks may provide always on telematics where user equipment (UE)s, e.g., v-UEs, communicate directly to the network (V2N), to pedestrian UEs (V2P), to infrastructure devices (V2I), and to other v-UEs (e.g., via the network). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

In some aspects, one or more of the UEs 115 may include a UE platooning communication manager 101. For example, the UE 115 may be a vehicle (e.g., a vehicle equipped or otherwise configured to communicate using the described wireless techniques) that is a part of a group of platooning vehicles. As one example where the UE 115 is the lead vehicle in the platoon, the UE platooning communication manage 101 may determine a communication resource requirement for the group of platooning vehicles. The communication requirement may be determined based on the number of vehicles in the group of platooning vehicles and a communication range of some or all of the vehicles in the platoon. The UE platooning communication manager 101 may identify, based on the communication resource requirement, an assignment of time-frequency radio resources to use for inter-vehicle communications within the group of platooning vehicles. The UE platooning communication manager 101 may transmit an indication of the assigned time-frequency radio resources to the vehicles in the platoon.

In another example where the UE 115 is not the lead vehicle (e.g., any vehicle in the group of platooning vehicles), the UE platooning communication manager 101 may determine a sequential identifier (e.g., the VID) of the vehicle within a group of platooning vehicles (e.g., the VID of the UE 115). The sequential identifier may be based on an order of the vehicle within the group of platooning vehicles. The UE platooning communication manager 101 may identify a set of time-frequency radio resources associated with inter-vehicle communications within the group of platooning vehicles. The UE platooning communication manager 101 may select a subset of the time-frequency radio resources to use for the inter-vehicle communications. The subset of time-frequency radio resource may be based at least in part on the sequential identifier of the vehicle, a number of vehicles in the group of platooning vehicles, a communication range of at least a portion of the vehicles, or a combination thereof. The UE platooning communication manager 101 may perform inter-vehicle communications using the selected subset of time-frequency radio resources.

Figure 2:
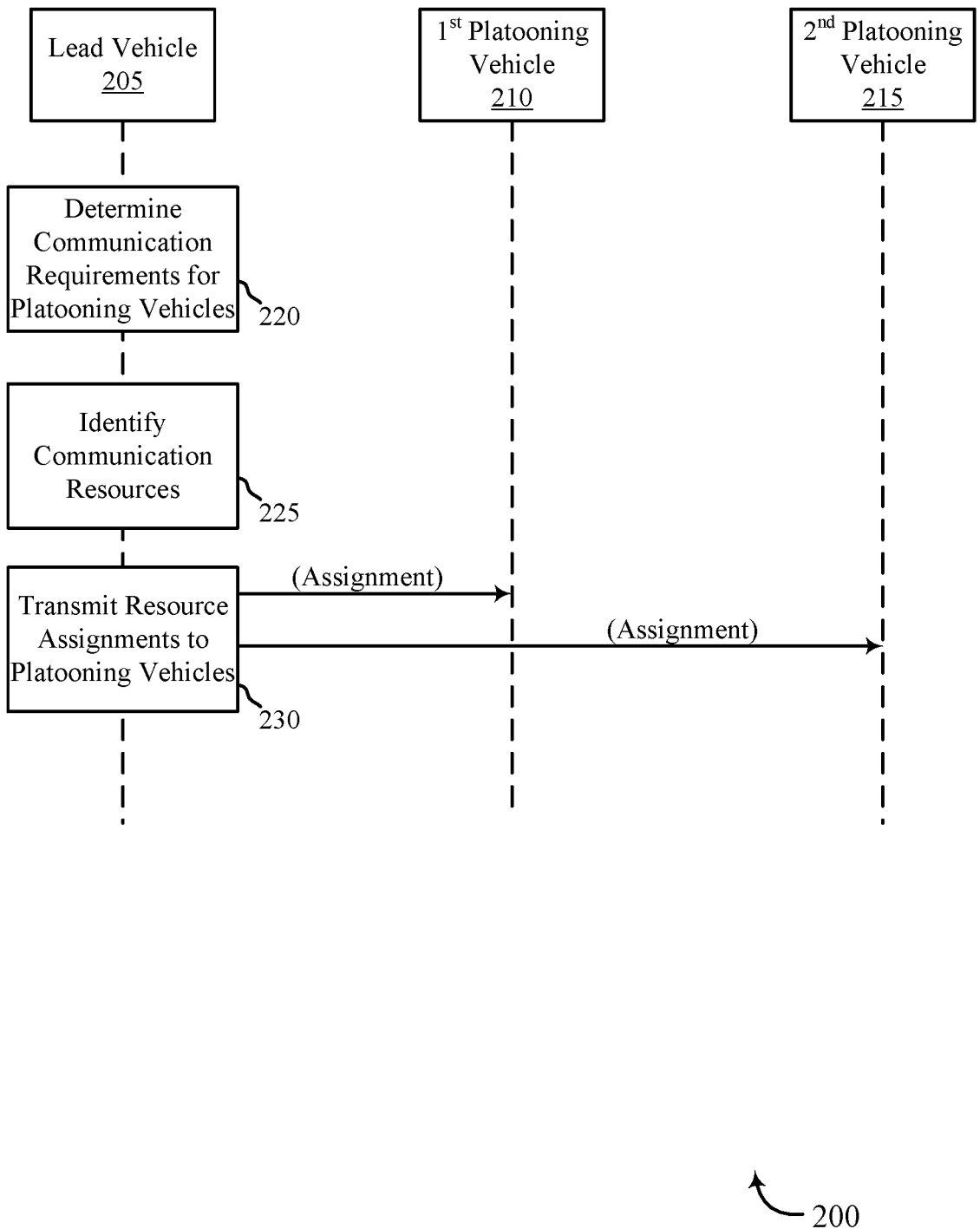
FIG. 2 illustrates an example of a process that supports methods to enable efficient intra-platoon communication, in accordance with one or more aspects of the present disclosure.

FIG. 2 illustrates an example of a process 200 that supports methods to enable efficient intra-platoon communication, in accordance with one or more aspects of the present disclosure. Process 200 may implement aspect(s) of the wireless communication system of FIG. 1. Process 200 may include a lead vehicle 205, a first platooning vehicle 210, and a second platooning vehicle 215, which each may be an example of a UE 115 as described herein.

Generally, the lead vehicle 205, the first platooning vehicle 210, and the second platooning vehicle 215 may form a group of platooning vehicles, which may include vehicles traveling along a similar path, in a similar direction, at approximately the same speed, etc. Although the process 200 shows three vehicles in the group of platooning vehicles, it is to be understood that a group of platooning vehicles may include more or fewer vehicles. Moreover, the number and order of vehicles within the group of platooning vehicles may change dynamically, e.g., depending upon traffic conditions, vehicles entering/exiting the roadway, etc.

It is to be understood that references to a vehicle may generally refer to a UE 115, as is described herein. For example, a vehicle may be configured as a UE 115 to perform wireless communications in a wireless communication system using any of the described and/or future wireless communication systems. The vehicle may support V2V, V2X, V2I, etc., wireless communications. However, it can also be appreciated that each vehicle may have different wireless communication capabilities, e.g., communication range, communication throughput capabilities, and the like. For example, the group of platooning vehicles may include legacy and/or advanced communication capabilities.

In some aspects, process 200 illustrates one example where the lead vehicle 205 oversees, controls, or otherwise manages aspects of inter-vehicle communications between the vehicles in the platoon. For example, the lead vehicle may identify resources to use for the inter-vehicle communications, may select the communication schedule to be used for the inter-vehicle communications (not shown), may act as a central controller for each vehicle with respect to speed, separation distance, and the like. In some aspects, the lead vehicle 205 may communicate directly with every vehicle in the platoon or may communicate directly with some of the vehicles and use relay communications to obtain communications from the remaining vehicles (e.g., vehicles near the rear of the platoon and/or with limited communication range). However, in other aspects as is described in more detail below, each vehicle in the platoon may independent manage identifying platooning communication resources and any associated communication schedule.

At 220, the lead vehicle 205 may determine a communication resource requirement for the group of platooning vehicles. Generally, the communication resource requirements may be the amount of time-frequency radio resources needed for each vehicle in the platoon of vehicles to perform inter-vehicle communications in order to exchange various vehicle information, e.g., traveling speed, traveling direction, separation distance between a particular vehicle and the adjacent vehicles, vehicle sensor data, information relayed from other vehicles within the platoon, the vehicle's sequential identifier (e.g., VID), and the like. Accordingly, the communication resource requirement may include one or more frequencies, tones, channels, etc., in the frequency domain along with, in some instances, a certain number of time periods, e.g., symbol periods, TTI, subframes, etc., in the time domain. In other instances, the communication resource requirement may include the frequency domain component, but may be ongoing in the time domain, e.g., not limited to a certain number of time periods.

In some aspects, the communication resource requirements may be based on how many vehicles are in the group of platooning vehicles, e.g., a number of vehicles. The communication resource requirements may be based on the communication range of some or all of the vehicles in the group of platooning vehicles. The communication resource requirement may be based on other factors, such as the speed of travel for the group of platooning vehicles, the separation distance between the vehicles within the platoon, the resource block size being used for the inter-vehicle communications, and the like. In some aspects, some or all of the above-mentioned factors may be used independently and/or combined to determine the communication resource requirement. In some aspects, the communication range of the vehicles within the platoon may determine which vehicle's communications will be received directly by other vehicles within the platoon and which vehicle's communications will need to be relayed by other vehicles in the platoon (e.g., one-hop relays, two-hop relays, etc.). Accordingly, the communication range of some or all of the vehicles in the platoon may impact the amount of communications resources needed to ensure comprehensive inter-vehicle communications.

In some aspects, the lead vehicle 205 may determine the communication resource requirement based on information obtained from the other vehicles in the platoon. For example, the lead vehicle 205 may obtain communications from the vehicles in the platoon via direct communications and/or via relayed communications. The communications may be based on platooning operations of the vehicles and/or other communications originating from the vehicles. Based on the communications, the lead vehicle 205 may determine the number of vehicles within the group of platooning. In some aspects, the lead vehicle may use this information to assign sequential identifiers (e.g., VIDs) to the vehicles forming the platoon of vehicles. The sequential identifier for each vehicle may be based on the order or position that the vehicle is located within the platoon. For example, the lead vehicle may assign VID=1 to itself since it is the first vehicle in the platoon, VID=2 to the next vehicle in the platoon (e.g., the vehicle immediately behind the lead vehicle 205), and so on. The number of sequential identifiers may therefore be the same as the number of vehicles with the platoon.

In some aspects, the sequential identifiers for some or all of the vehicles in the platoon may change as vehicles leave and/or are added to the group of platooning vehicles. Moreover, the platooning vehicle leading the platoon (e.g., lead vehicle 205) may also change dynamically. For example, the current lead vehicle 205 may exit the platoon (e.g., leave the road, lane, etc.) and the next vehicle in the platoon may assume the role as the new lead vehicle. In some aspects, vehicles within the group of platooning vehicles may transmit information indicative of them leaving and/or entering the group of platooning vehicles, e.g., information indicative of a travel direction change (e.g., blinker activation/deactivation, updated location information, etc.), changes in speed (e.g., sudden and/or excessive changes in speed, braking activation/de-activation, etc.), and the like. The other vehicles within the platoon of vehicles may receive this information and update their behavior accordingly, e.g., update sequential identifiers for the platooning vehicles, change communication schedules and/or time-frequency radio resources used for communications, and the like.

At 225, the lead vehicle 205 may identify communication resources to use for the group of platooning vehicles. For example, the lead vehicle 205 may use the determined communication resource requirement to identify an assignment of time-frequency radio resources to use for the inter-vehicle communications within the group of platooning vehicles. The lead vehicle 205 may identify the time-frequency radio resources using a variety of mechanisms, either individually or in combination. In some aspects, the assignment of time-frequency radio resources may include licensed and/or unlicensed radio frequency spectrum band(s).

In some aspects, the lead vehicle 205 may identify the assignment of time-frequency radio resources based on communications with a base station. For example, the lead vehicle 205 may transmit a resource request message to a base station that includes information indicative of or otherwise associated with the communication resource requirement for the group of platooning vehicles. The base station (or other network device) may receive the resource request message and identify time-frequency radio resources to be allocated to the group of platooning vehicles. The base station may transmit a resource assignment message to the lead vehicle 205 conveying an assignment or indication of time-frequency radio resources that have been assigned to the group of platooning vehicles.

In some aspects, the lead vehicle 205 may identify the assignment of time-frequency radio resources based on pre-configured information stored or otherwise available to the lead vehicle 205. For example, the lead vehicle 205 may maintain a look-up table containing information associated with platooning operations. The look-up table may store time-frequency radio resources usable for platooning operations that the lead vehicle 205 may select from randomly, based on various factors associated with the particular platoon (e.g., platoon size, speed, location, etc.), based on the location of the platoon (e.g., local, regional, and/or national location), based on the direction of travel for the platoon, and the like. Accordingly, the lead vehicle 205 may identify the assignment of time-frequency radio resources based on the pre-configured information and use this resource assignment for inter-vehicle communications.

In some aspects (not shown in process 200), the lead vehicle 205 may use the assigned time-frequency radio resources to assign resources to the vehicles within the group of platooning vehicles (e.g., create a communication schedule for the platoon of vehicles). For example, the lead vehicle 205 may select time-frequency radio resources for the vehicles based on the sequential identifier of the vehicle. For example, the lead vehicle 205 may select a first subset of time-frequency radio resources to a first group of vehicles in the platoon (e.g., vehicles with odd-numbered VIDs) and a second subset of time-frequency radio resources to a second group of vehicles in the platoon (e.g., vehicles with even-numbered VIDs). The first subset of time-frequency radio resource may overlap in frequency with the second subset, but may not overlap in time. For example, the first group of vehicles may communicate during a first time period using different non-overlapping frequencies and the second group of vehicles may communicate during a second time period using the different non-overlapping frequencies. Thus, frequency reuse may be achieved and may include assigning frequencies to vehicles that are not within communication range of each other (e.g., lead vehicle 205 and the tail vehicle) to avoid interference.

In some aspects (not shown in process 200), the assigned time-frequency radio resources may be used by the lead vehicle 205 to create a communication schedule to be used for inter-vehicle communications. The communication schedule may be updated according to a periodic schedule and/or as-needed (e.g., when vehicles leave and/or are added to the platoon).

At 230, the lead vehicle 205 may transmit information associated with the assigned resources to be used for inter-vehicle communication between the group of platooning vehicles to the first platooning vehicle 210 and the second platooning vehicle 215. The transmission may be a broadcast transmission to all platooning vehicles and/or a unicast transmission to each vehicle in the platoon. In some aspects, the lead vehicle 205 may broadcast the information and other vehicles within the platoon may relay the broadcast information to other vehicles (e.g., vehicles outside of the communication range of the lead vehicle 205).

In some aspects (such as is shown in process 200), the lead vehicle 205 may broadcast the assigned time-frequency radio resources to the vehicles within the group of platooning vehicles and then each vehicle may use its VID and the assigned time-frequency radio resources to determine its own communication schedule (e.g., which subset of time-frequency radio resources that vehicle uses). In other aspects, the lead vehicle 205 may use the assigned time-frequency radio resources to create and distribute the communication schedule to the other vehicles in the group of platooning vehicles.

Thus in some aspects, the vehicles in the platoon may form a typical string topology. To avoid the conflicts (e.g., hidden node problems, half-duplex communications, etc.) in such a topology, the described techniques assign a VID to the platoon vehicles sequentially, e.g., the first vehicle with VID=1, the second vehicle with VID=2, etc. Then, the platoon members' transmissions are arranged in time-domain and frequency domain where the odd VIDs and even VIDs are arranged in non-overlapping time (e.g., different time periods, TTIs, different symbol periods, different subframes, etc.). For all vehicles with odd VIDs, they may use FDM in the frequency domain during their associated transmission period and the even VIDs may use FDM in the frequency domain during their associated transmission period. The reuse ratio in the frequency domain may depend on the radio range (e.g., communication range), and the car length and spacing in the platoon, etc. For example, certain VIDs (e.g., those with limited communication range) may use the same frequency during the associated transmission period when such communications will not interfere with other vehicles using the same frequency. Vehicles within communication range are using orthogonal resources for inter-vehicle communications to avoid conflict and loss of communications by other platoon vehicles.

Figure 3:
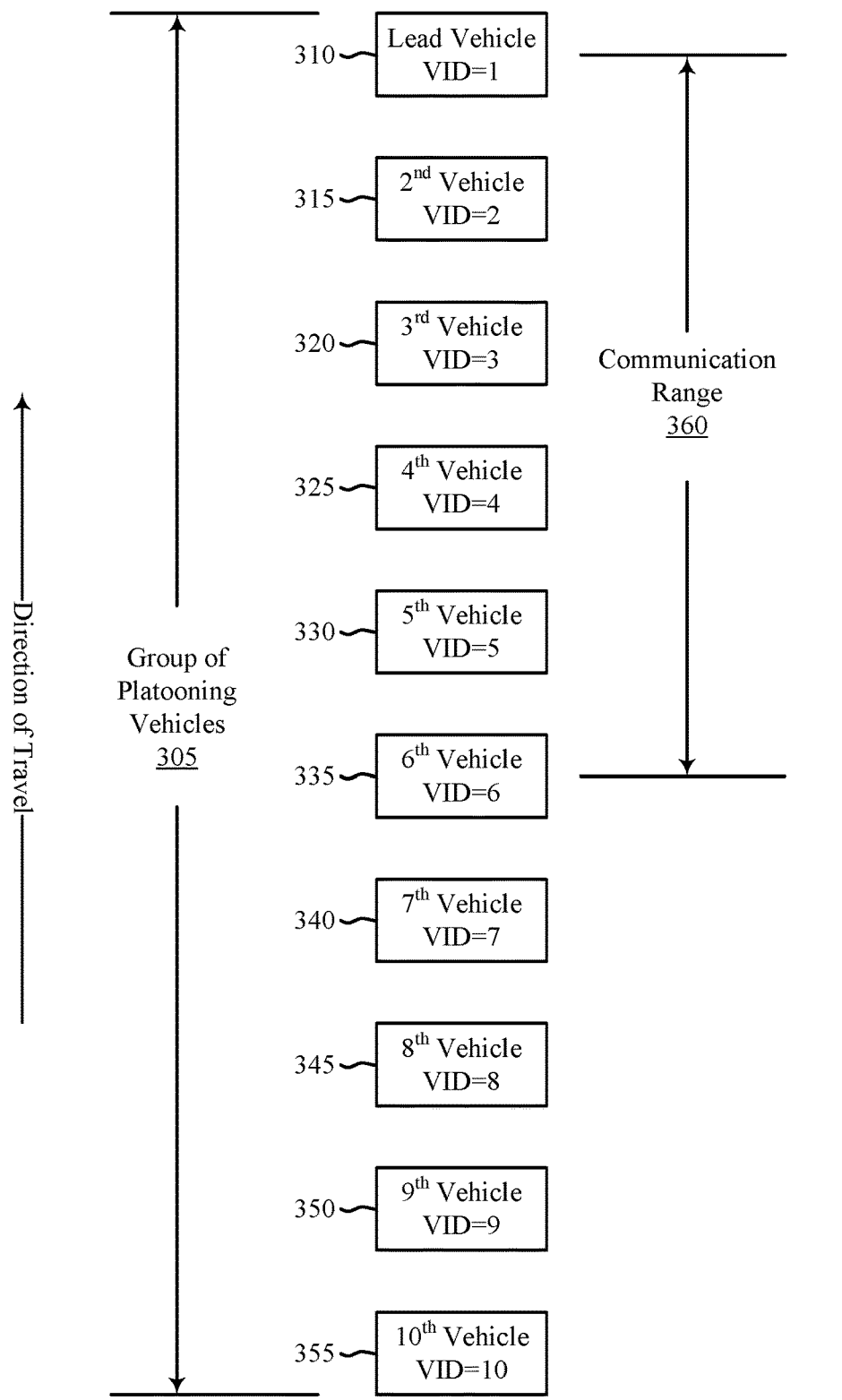
FIG. 3 illustrates an example of a platooning configuration that supports methods to enable efficient intra-platoon communication, in accordance with one or more aspects of the present disclosure.

FIG. 3 illustrates an example of a platooning configuration 300 that supports methods to enable efficient intra-platoon communication, in accordance with one or more aspects of the present disclosure. Platooning configuration 300 may implement aspect(s) of wireless communication system 100 and/or process 200.

Platooning configuration 300 may include a group of platooning vehicles 305, which may include a plurality of vehicles. The number and/or location of the vehicles forming the group of platooning vehicles 305 may change dynamically, e.g., as vehicles leave and/or are added to the platoon, as vehicles change positions within the platoon, etc. Generally, the group of platooning vehicles 305 may form a string topology which includes vehicle traveling in a relatively straight line (e.g., within the same lane of traffic, within the same lanes of traffic traveling in the same direction of a highway, etc.). Moreover, the group of platooning vehicles 305 may each be traveling at or about the same speed.

Platooning configuration 300 may include a number of vehicles forming the platoon. In the example platooning configuration 300, there are ten vehicles in the platoon, starting with lead vehicle 310 and subsequent vehicles 315, 320, 325, 330, 335, 340, 345, 350, and 355. It is to be understood that there may be more or fewer vehicles within the group of platooning vehicles 305 and, also, that the number of vehicles within the platoon may change on a dynamic basis.

Each vehicle within the group of platooning vehicles 305 may be assigned a sequential identifier, such as a VID. The sequential identifier may be based on the location or position of that particular vehicle within the platoon. Thus, the lead vehicle 310 may be assigned VID=1, the second vehicle 315 may be assigned VID=2, the third vehicle 320 may be assigned VID=3, and so on. The sequential identifiers for each vehicle may change as vehicles are added to and/or exit the platoon, as vehicles change position within the platoon, etc.

Each vehicle within the group of platooning vehicles 305 may have an associated communication range. For example, the lead vehicle 310 may have a communication range 360 that may include a coverage area extending back to the sixth vehicle 335. However, other vehicles within the group of platooning vehicles 305 may have different communication ranges. Communications from the vehicles behind the sixth vehicle 335 (e.g., the seventh vehicle 340, the eighth vehicle 345, and so on) may be obtained by lead vehicle 310 via relay communications from the others in the platoon. In some aspects, the communication range 360 and the communication ranges of the other vehicles may determine, at least to some degree, the communication resource requirement for the group of platooning vehicles 305, e.g., may dictate the number of communication resources that may be needed for relay transmissions.

As discussed above, an assignment of time-frequency radio resource may be identified or otherwise selected for the group of platooning vehicles 305. The time-frequency radio resources may be assigned according to a communication schedule which is used for inter-vehicle communications within the platoon. The communications schedule may include assigning different subsets of time-frequency radio resources to different groups of vehicles within the group of platooning vehicles 305. In one non-limiting example, vehicles with odd-numbered VIDs may be assigned non-overlapping time resources with even-numbered VIDs. In another non-limiting example, vehicles with odd-numbered VIDs may be assigned overlapping frequency resources with even-numbered VIDs.

Figure 4:
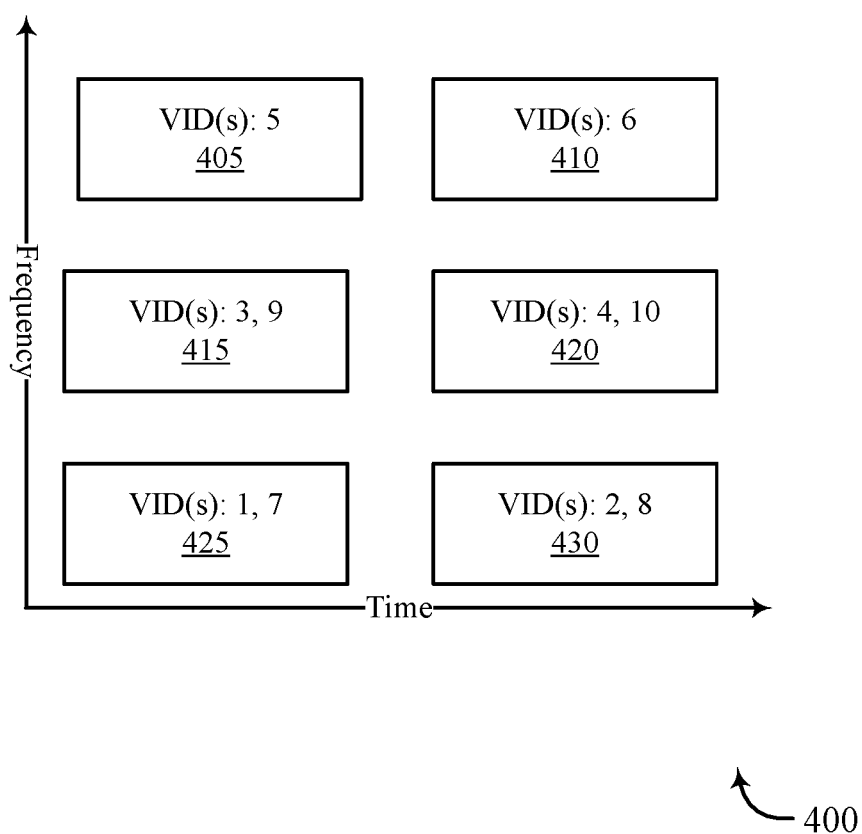
FIG. 4 illustrates an example of a resource assignment scheme that supports methods to enable efficient intra-platoon communication, in accordance with one or more aspects of the present disclosure.

FIG. 4 illustrates an example of a resource assignment scheme 400 that supports methods to enable efficient intra-platoon communication, in accordance with one or more aspects of the present disclosure. Resource assignment scheme 400 may implement aspects of wireless communication system 100, process 200, and/or platooning configuration 300, as is described herein. For example, the resource assignment scheme 400 may be implemented by a group of platooning vehicles for improved inter-vehicle communications during platooning operations. The resource assignment scheme 400 may be an example of time-frequency radio resources assigned to a group of platooning vehicles.

Generally, resource assignment scheme 400 may include a plurality of symbol periods in the time domain and a plurality of frequencies in the frequency domain. The resource assignment scheme 400 further illustrates one example of a communication schedule used for the vehicles in the group of platooning vehicles. For example, vehicles with odd-numbered VIDs (e.g., VIDs 1, 3, 5, 7, and 9) may be assigned a first subset of the time-frequency radio resources that includes transmissions during the first symbol period. Similarly, vehicles with even-numbered VIDs (e.g., VIDs 2, 4, 6, 8, and 10) may be assigned a second subset of time-frequency radio resources that includes transmissions during the second symbol period. Thus, vehicles with odd-numbered VIDs use non-overlapping time domain multiplexing with respect to the vehicles with even-numbered VIDs.

In some aspects, vehicles transmitting during a particular symbol period may use non-overlapping frequency resources. For example, the vehicles with odd-numbered VIDs that are transmitting during the first symbol period may include VIDs 1 and 7 transmitting using a first frequency, VIDs 3 and 9 transmitting using a second frequency, and VID 5 transmitting using a third frequency during the first symbol period. The selection of the VID 1 and 7 for transmission using the first frequency at the same time may be based on the communication range of the vehicles within the platoon, e.g., selected to avoid collisions between the transmissions from VIDs 1 and 7. The same consideration may be used when selecting the VIDs 3 and 9 for transmission using the second frequency during the first period, e.g., based on the communication ranges of the vehicles with VIDs 3 and 9.

Similarly, the vehicles with even-numbered VIDs that are transmitting during the second symbol period may include VIDs 2 and 8 transmitting using a first frequency, VIDs 4 and 10 transmitting using a second frequency, and VID 6 transmitting using a third frequency during the second symbol period. The selection of the VID 2 and 8 for transmission using the first frequency at the same time may be based on the communication range of the vehicles within the platoon, e.g., selected to avoid collisions between the transmissions from VIDs 2 and 8. The same consideration may be used when selecting the VIDs 4 and 10 for transmission using the second frequency during the second symbol period, e.g., based on the communication ranges of the vehicles with VIDs 4 and 10. Thus, vehicles with odd-numbered VIDs may use overlapping frequency domain multiplexing with respect to the vehicles with even-numbered VIDs.

Although resource assignment scheme 400 illustrates one example of time-frequency radio resource assignments for the group of platooning vehicles, the described techniques are not limited to such resource assignment. For example, other resource assignments may include more than two subsets of time-frequency radio resources, where the vehicles are divided among more than two symbol periods, use more than three frequency resources, etc.

Figure 5:
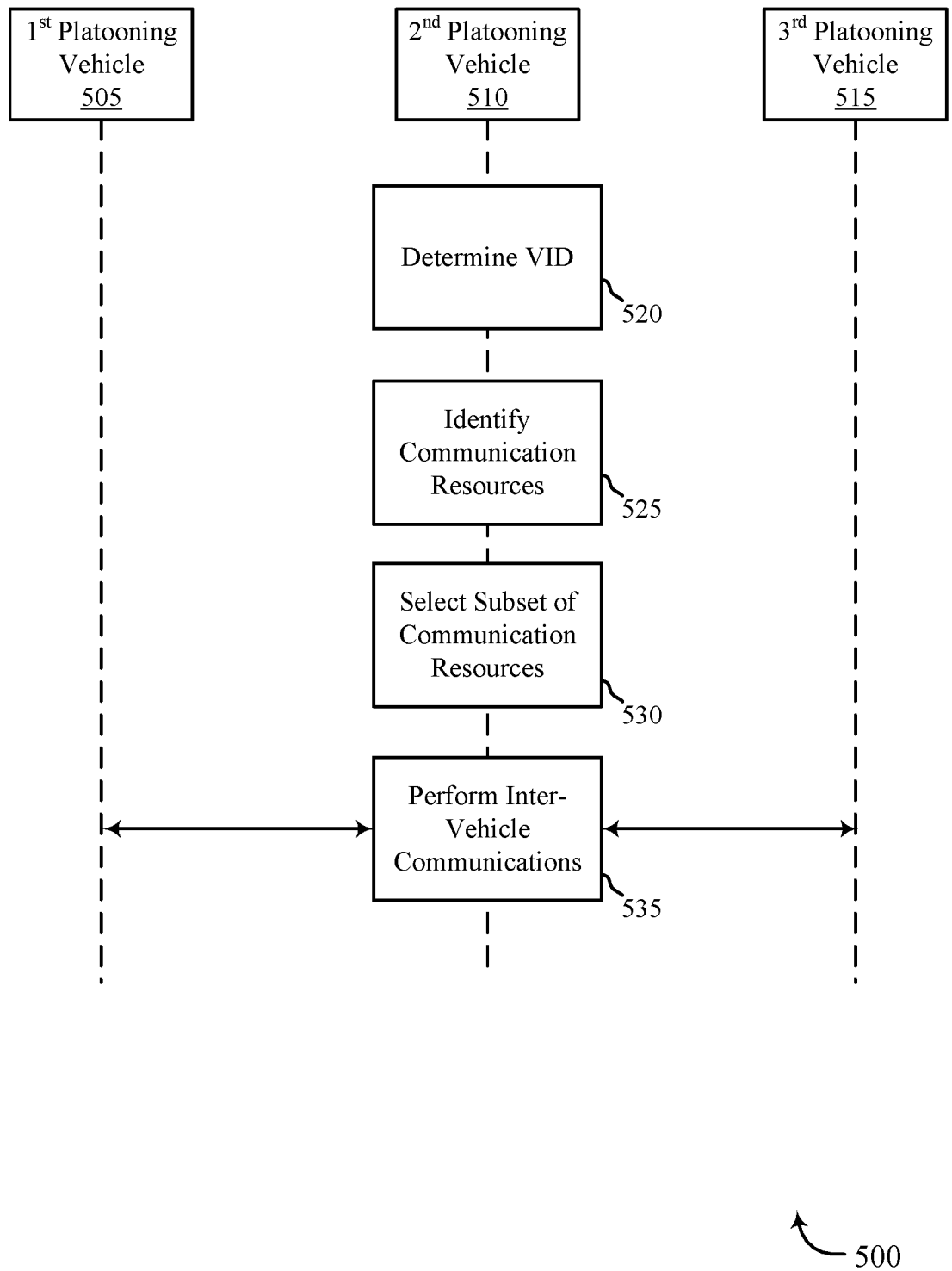
FIG. 5 illustrates an example of a process that supports methods to enable efficient intra-platoon communication, in accordance with one or more aspects of the present disclosure.

FIG. 5 illustrates an example of a process 500 that supports methods to enable efficient intra-platoon communication, in accordance with one or more aspects of the present disclosure. Process 500 may implement aspects of wireless communication system 100, process 200, platooning configuration 300, and/or resource assignment scheme 400. Process 500 may include a first platooning vehicle 505, a second platooning vehicle 510, and a third platooning vehicle 515, which may be examples of the corresponding devices described herein. Generally, process 500 illustrates an example where any vehicle within the group of platooning vehicles may independently select or otherwise identify its communication schedule to use for inter-vehicle communications during platooning operations. Moreover, while the example process 500 is discussed with reference to the second platooning vehicle 510, it is to be understood that any vehicle in the group of platooning vehicles may be configured to support the functions illustrated in process 500.

At 520, the second platooning vehicle 510 may determine its VID. For example, the second platooning vehicle 510 may determine its sequential identifier based on the order of the second platooning vehicle 510 within the group of platooning vehicles. Assuming that the first platooning vehicle 505 is the lead vehicle, the second platooning vehicle 510 may have a VID of 2. The second platooning vehicle 510 may determine its sequential identifier based on information received from the lead vehicle of the platoon, based on information received from a base station, and/or from information received from other vehicles within the group of platooning vehicles.

At 525, the second platooning vehicle 510 may identify communication resources. For example, the second platooning vehicle 510 may identify time-frequency radio resources that are available or otherwise associated with inter-vehicle communications with the group of platooning vehicles. The second platooning vehicle 510 may identify the communication resources based on information received from the lead vehicle (e.g., a broadcast message) that conveys an indication of the time-frequency radio resources. Additionally or alternatively, the second platooning vehicle 510 may identify the time-frequency radio resources based on a pre-configured resource pool available or otherwise associated with platooning vehicles. The resource pool may be known by some or all vehicles within the platoon and may include any number of resource pool configurations available for use during platooning operations.

At 530, the second platooning vehicle 510 may select a subset of assigned communication resources. For example, the second platooning vehicle 510 may select a subset of time-frequency radio resources to use for the inter-vehicle communications. The subset of time-frequency radio resources may be based on the sequential identifier of the second platooning vehicle 510, the number of vehicles in the platoon, the communication range of some or all of the vehicles within the platoon, etc., as is discussed above. In some examples, the broadcast message received from the base station and/or the lead vehicle may contain or otherwise convey an indication of the subset of time-frequency radio resources.

In some aspects, the second platooning vehicle 510 may share the subset of time-frequency radio resources with other vehicle(s) within the platoon. For example, the second platooning vehicle 510 may share the subset of time-frequency radio resources based on the communication range of the vehicle(s) within the platoon, the number of vehicles within the platoon, the spacing between the vehicles within the platoon, the travel speed of the platoon, etc. In some examples, sharing the subset of time-frequency radio resources may include the communication schedule as is described with reference to FIGS. 2 through 4. In some aspects, sharing the time-frequency radio resources may include using resources that are TDM with respect to time-frequency radio resources used by vehicles adjacent to the second platooning vehicle 510 (e.g., the first platooning vehicle 505 and the third platooning vehicle 515).

At 535, the second platooning vehicle 510 may perform inter-vehicle communications with the first platooning vehicle 505 and/or the third platooning vehicle 515. For example, the second platooning vehicle 510 may perform inter-vehicle communications with some or all of the vehicles in the platoon.

Figure 6:
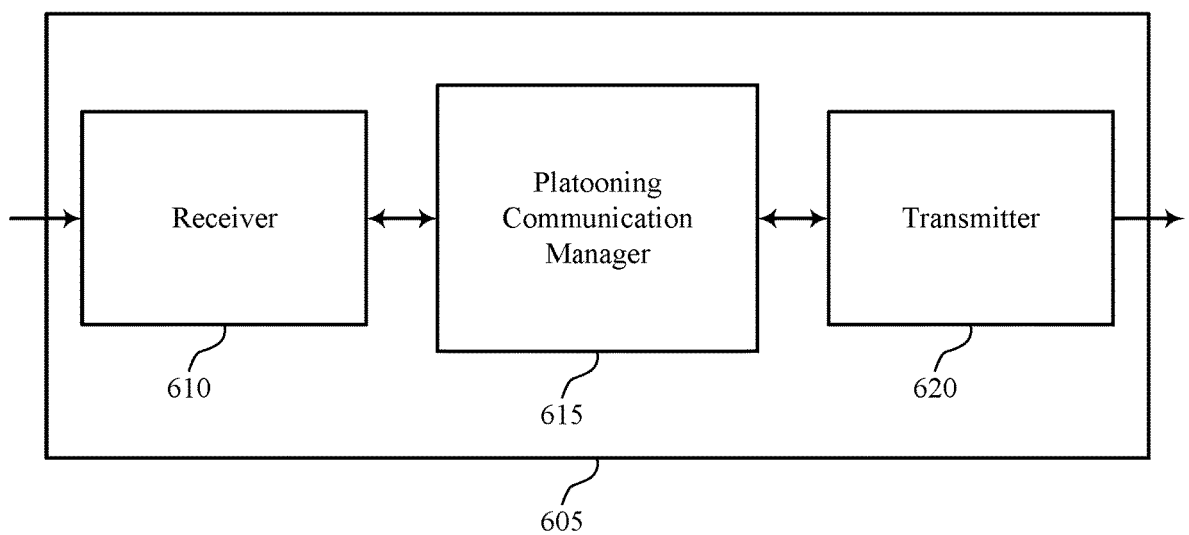
FIGS. 6 through 8 show block diagrams of a device that supports methods to enable efficient intra-platoon communication, in accordance with one or more aspects of the present disclosure.

FIG. 6 shows a block diagram 600 of a wireless device 605 that supports methods to enable efficient intra-platoon communication, in accordance with one or more aspects of the present disclosure. Wireless device 605 may be an example of aspects of a UE 115 as described herein. Wireless device 605 may include receiver 610, platooning communication manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to methods to enable efficient intra-platoon communication, etc.). Information may be passed on to other components of the device. The receiver 610 may be an example of aspects of the transceiver 935 described with reference to FIG. 9. The receiver 610 may utilize a single antenna or a set of antennas.

Platooning communication manager 615 may be an example of aspects of the platooning communication manager 915 described with reference to FIG. 9.

Platooning communication manager 615 and/or at least some of its various sub-components may be implemented in hardware, software executed by a processor, firmware, or any combination thereof. If implemented in software executed by a processor, the functions of the platooning communication manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The platooning communication manager 615 and/or at least some of its various sub-components may be physically located at various positions, including being distributed such that portions of functions are implemented at different physical locations by one or more physical devices. In some examples, platooning communication manager 615 and/or at least some of its various sub-components may be a separate and distinct component in accordance with various aspects of the present disclosure. In other examples, platooning communication manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Platooning communication manager 615 may determine a communication resource requirement for a group of platooning vehicles, the communication resource requirement based on a number of vehicles forming the group of platooning vehicles and a communication range of at least a portion of the vehicles. Platooning communication manager 615 may identify, based on the identified communication resource requirement, an assignment of time-frequency radio resources to use for inter-vehicle communications in the group of platooning vehicles. Platooning communication manager 615 may transmit an indication of the assignment of time-frequency radio resources to the group of platooning vehicles. The platooning communication manager 615 may also determine a sequential identifier of a vehicle within a group of platooning vehicles, the sequential identifier based on an order of the vehicle within the group of platooning vehicles. Platooning communication manager 615 may identify a set of time-frequency radio resources associated with inter-vehicle communications within the group of platooning vehicles. Platooning communication manager 615 may select a subset of the time-frequency radio resources to use for the inter-vehicle communications, the subset of time-frequency radio resource being based on the sequential identifier of the vehicle, a number of vehicles in the group of platooning vehicles, a communication range of at least a portion of the vehicles, or a combination thereof. Platooning communication manager 615 may perform inter-vehicle communications using the selected subset of time-frequency radio resources.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
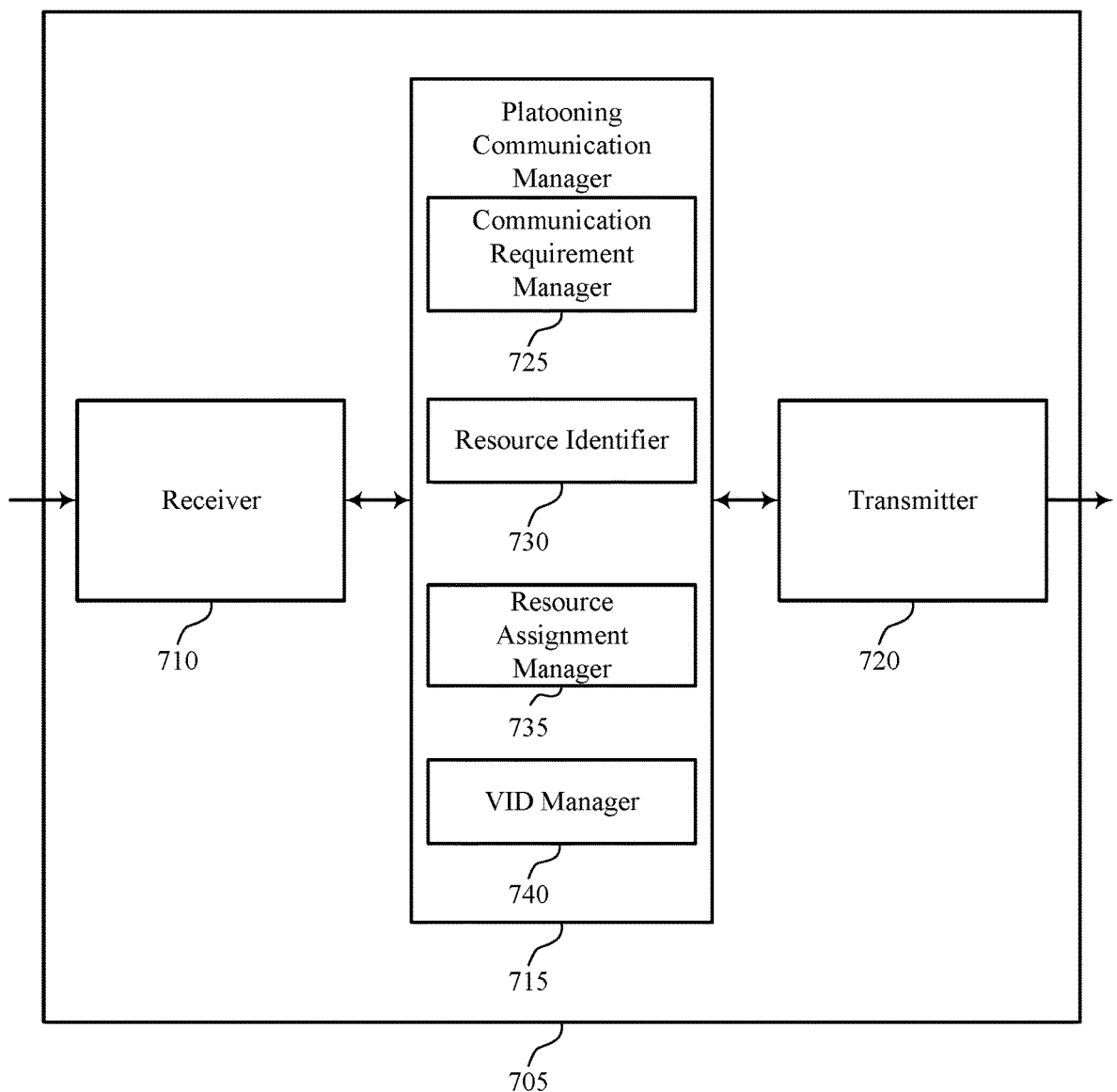

FIG. 7 shows a block diagram 700 of a wireless device 705 that supports methods to enable efficient intra-platoon communication, in accordance with one or more aspects of the present disclosure. Wireless device 705 may be an example of aspects of a wireless device 605 or a UE 115 as described herein. Wireless device 705 may include receiver 710, platooning communication manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to methods to enable efficient intra-platoon communication, etc.). Information may be passed on to other components of the device. The receiver 710 may be an example of aspects of the transceiver 935 described with reference to FIG. 9. The receiver 710 may utilize a single antenna or a set of antennas.

Platooning communication manager 715 may be an example of aspects of the platooning communication manager 915 described with reference to FIG. 9. Platooning communication manager 715 may also include communication requirement manager 725, resource identifier 730, resource assignment manager 735, and VID manager 740.

Communication requirement manager 725 may determine a communication resource requirement for a group of platooning vehicles, the communication resource requirement based on a number of vehicles forming the group of platooning vehicles and a communication range of at least a portion of the vehicles.

Resource identifier 730 may identify, based on the identified communication resource requirement, an assignment of time-frequency radio resources to use for inter-vehicle communications in the group of platooning vehicles. Resource identifier 730 may receive a resource assignment message from the base station, the resource assignment message conveying an assignment of the time-frequency radio resources. Resource identifier 730 may identify a pre-configured resource pool available to use in the group of platooning vehicles. Resource identifier 730 may select, from the pre-configured resource pool, the assignment of the time-frequency radio resources. Resource identifier 730 may transmit a resource request message to a base station, the resource request message conveying an indication of the identified resource requirement. Resource identifier 730 may identify a set of time-frequency radio resources associated with inter-vehicle communications within the group of platooning vehicles. Resource identifier 730 may receive a broadcast message from a lead vehicle in the group of platooning vehicles, the broadcast message conveying an indication of the time-frequency radio resources. Resource identifier 730 may select, from the pre-configured resource pool and based on the sequential identifier, the subset of time-frequency radio resources. In some cases, the subset of time-frequency radio resources are time division multiplexed with time-frequency radio resources used for inter-vehicle communications by each vehicle located adjacent to the vehicle. In some cases, the communication resource requirement is further based on a travel speed of the group of platooning vehicles, a distance between the vehicles in the group of platooning vehicles, a resource block size used for the inter-vehicles communications, or combinations thereof. In some cases, the broadcast message further conveying an indication of the subset of time-frequency radio resources. In some cases, the time-frequency radio resources include using a licensed radio frequency spectrum band, an unlicensed radio frequency spectrum band, or combinations thereof.

Resource assignment manager 735 may transmit an indication of the assignment of time-frequency radio resources to the group of platooning vehicles. Resource assignment manager 735 may select a subset of the time-frequency radio resources to use for the inter-vehicle communications, the subset of time-frequency radio resource being based on the sequential identifier of the vehicle, a number of vehicles in the group of platooning vehicles, a communication range of at least a portion of the vehicles, or a combination thereof. Resource assignment manager 735 may perform inter-vehicle communications using the selected subset of time-frequency radio resources.

VID manager 740 may assign a sequential identifier to each vehicle in the group of platooning vehicles according to the order in which the vehicle is located within the group of platooning vehicles. VID manager 740 may assign, according to the sequential identifiers, a first subset of time-frequency radio resources to a first group of vehicles and a second subset of time-frequency radio resources to a second group of vehicles, the first subset of time-frequency radio resources being non-overlapping in time and are overlapping in frequency with respect to the second subset of time-frequency radio resources. VID manager 740 may determine a number of frequency channels for the communication resource requirement based on the number of vehicles and the communication range of the portion of vehicles. VID manager 740 may determine a sequential identifier of a vehicle within a group of platooning vehicles, the sequential identifier based on an order of the vehicle within the group of platooning vehicles. VID manager 740 may determine the sequential identifier based on receiving the sequential identifier from a base station, or determining the sequential identifier based on information received from a lead vehicle of the group of platooning vehicles, or combinations thereof. In some cases, the first group of vehicles are associated with odd numbered sequential identifier and the second group of vehicles are associated with even numbered sequential identifiers.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
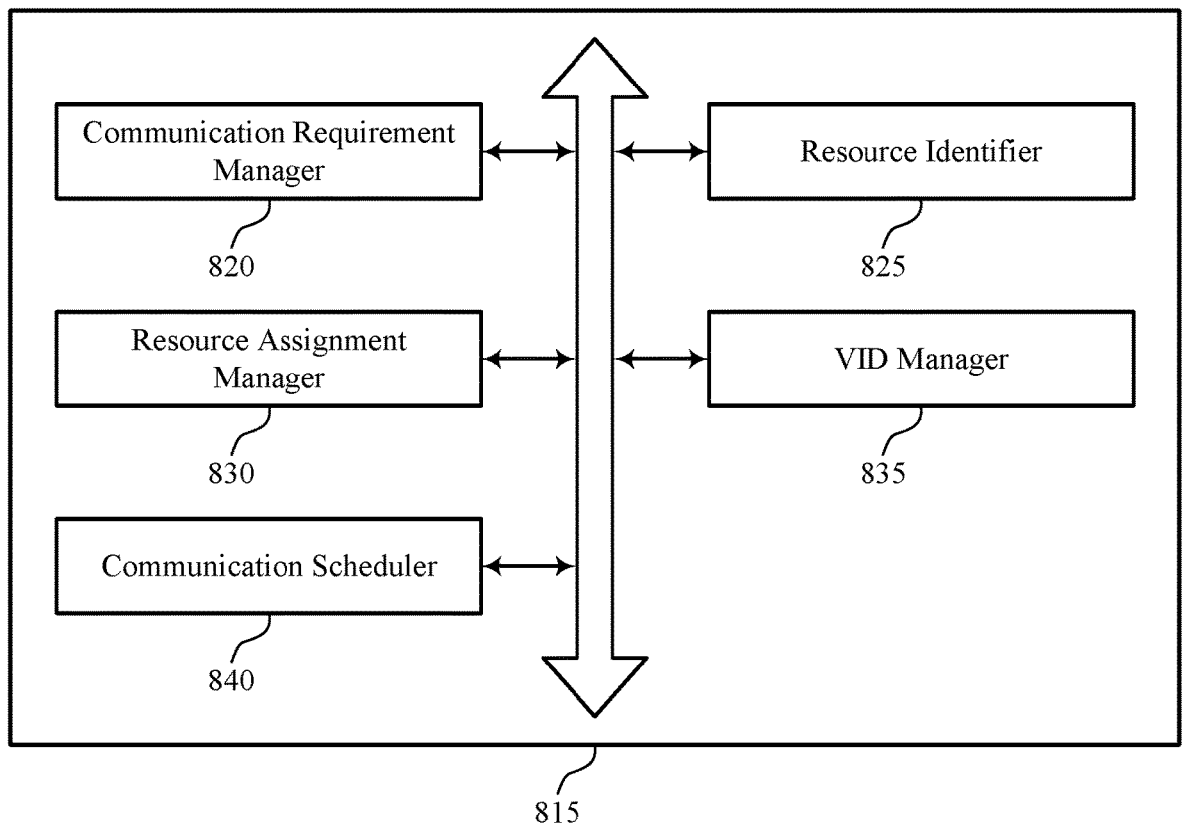

FIG. 8 shows a block diagram 800 of a platooning communication manager 815 that supports methods to enable efficient intra-platoon communication, in accordance with one or more aspects of the present disclosure. The platooning communication manager 815 may be an example of aspects of a platooning communication manager 615, a platooning communication manager 715, or a platooning communication manager 915 described with reference to FIGS. 6, 7, and 9. The platooning communication manager 815 may include communication requirement manager 820, resource identifier 825, resource assignment manager 830, VID manager 835, and communication scheduler 840. Each of these modules may communicate, directly or indirectly, with one another (e.g., via one or more buses).

Communication requirement manager 820 may determine a communication resource requirement for a group of platooning vehicles, the communication resource requirement based on a number of vehicles forming the group of platooning vehicles and a communication range of at least a portion of the vehicles.

Resource identifier 825 may identify, based on the identified communication resource requirement, an assignment of time-frequency radio resources to use for inter-vehicle communications in the group of platooning vehicles. Resource identifier 825 may receive a resource assignment message from the base station, the resource assignment message conveying an assignment of the time-frequency radio resources. Resource identifier 825 may identify a pre-configured resource pool available to use in the group of platooning vehicles. Resource identifier 825 may select, from the pre-configured resource pool, the assignment of the time-frequency radio resources. Resource identifier 825 may transmit a resource request message to a base station, the resource request message conveying an indication of the identified resource requirement. Resource identifier 825 may identify a set of time-frequency radio resources associated with inter-vehicle communications within the group of platooning vehicles. Resource identifier 825 may receive a broadcast message from a lead vehicle in the group of platooning vehicles, the broadcast message conveying an indication of the time-frequency radio resources. Resource identifier 825 may select, from the pre-configured resource pool and based on the sequential identifier, the subset of time-frequency radio resources. In some cases, the subset of time-frequency radio resources are time division multiplexed with time-frequency radio resources used for inter-vehicle communications by each vehicle located adjacent to the vehicle. In some cases, the communication resource requirement is further based on a travel speed of the group of platooning vehicles, a distance between the vehicles in the group of platooning vehicles, a resource block size used for the inter-vehicles communications, or combinations thereof. In some cases, the broadcast message further conveying an indication of the subset of time-frequency radio resources. In some cases, the time-frequency radio resources include using a licensed radio frequency spectrum band, an unlicensed radio frequency spectrum band, or combinations thereof.

Resource assignment manager 830 may transmit an indication of the assignment of time-frequency radio resources to the group of platooning vehicles. Resource assignment manager 830 may select a subset of the time-frequency radio resources to use for the inter-vehicle communications, the subset of time-frequency radio resource being based on the sequential identifier of the vehicle, a number of vehicles in the group of platooning vehicles, a communication range of at least a portion of the vehicles, or a combination thereof. Resource assignment manager 830 may perform inter-vehicle communications using the selected subset of time-frequency radio resources.

VID manager 835 may assign a sequential identifier to each vehicle in the group of platooning vehicles according to the order in which the vehicle is located within the group of platooning vehicles. VID manager 835 may assign, according to the sequential identifiers, a first subset of time-frequency radio resources to a first group of vehicles and a second subset of time-frequency radio resources to a second group of vehicles, the first subset of time-frequency radio resources being non-overlapping in time and are overlapping in frequency with respect to the second subset of time-frequency radio resources. VID manager 835 may determine a number of frequency channels for the communication resource requirement based on the number of vehicles and the communication range of the portion of vehicles. VID manager 835 may determine a sequential identifier of a vehicle within a group of platooning vehicles, the sequential identifier based on an order of the vehicle within the group of platooning vehicles. VID manager 835 may determine the sequential identifier based on receiving the sequential identifier from a base station, or determining the sequential identifier based on information received from a lead vehicle of the group of platooning vehicles, or combinations thereof. In some cases, the first group of vehicles are associated with odd numbered sequential identifier and the second group of vehicles are associated with even numbered sequential identifiers.

Communication scheduler 840 may determine a communication schedule for the group of platooning vehicles, the communication schedule including assigning at least a portion of the time-frequency radio resources to different vehicles. Communication scheduler 840 may transmit an indication of the communication schedule to the group of platooning vehicles. Communication scheduler 840 may obtain communications, according to the communications schedule and using at least a portion of the assigned time-frequency radio resources, from the vehicles of the group of platooning vehicles. Communication scheduler 840 may share the subset of time-frequency radio resources with at least one other vehicle, the sharing being based on a communication range of the other vehicle, a number of vehicles forming the group of platooning vehicles, a spacing between vehicles in the group of platooning vehicles, a travel speed of the group of platooning vehicles, or combinations thereof.

Figure 9:
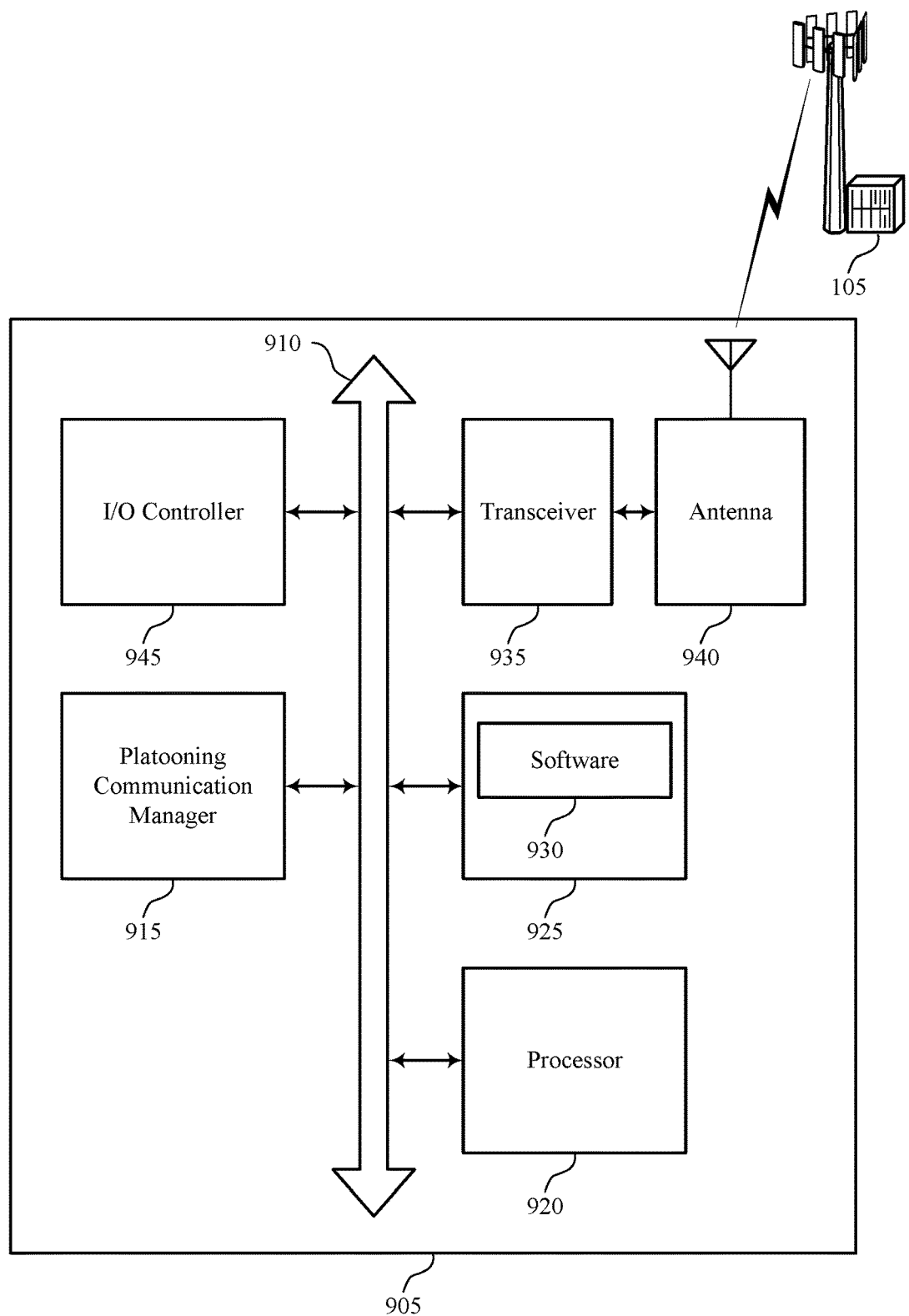
FIG. 9 illustrates a block diagram of a system including a UE that supports methods to enable efficient intra-platoon communication, in accordance with one or more aspects of the present disclosure.

FIG. 9 shows a diagram of a system 900 including a device 905 that supports methods to enable efficient intra-platoon communication, in accordance with one or more aspects of the present disclosure. Device 905 may be an example of or include the components of wireless device 605, wireless device 705, or a UE 115 as described herein. Device 905 may include components for bi-directional voice and data communications including components for transmitting and receiving communications, including platooning communication manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting methods to enable efficient intra-platoon communication).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support methods to enable efficient intra-platoon communication. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
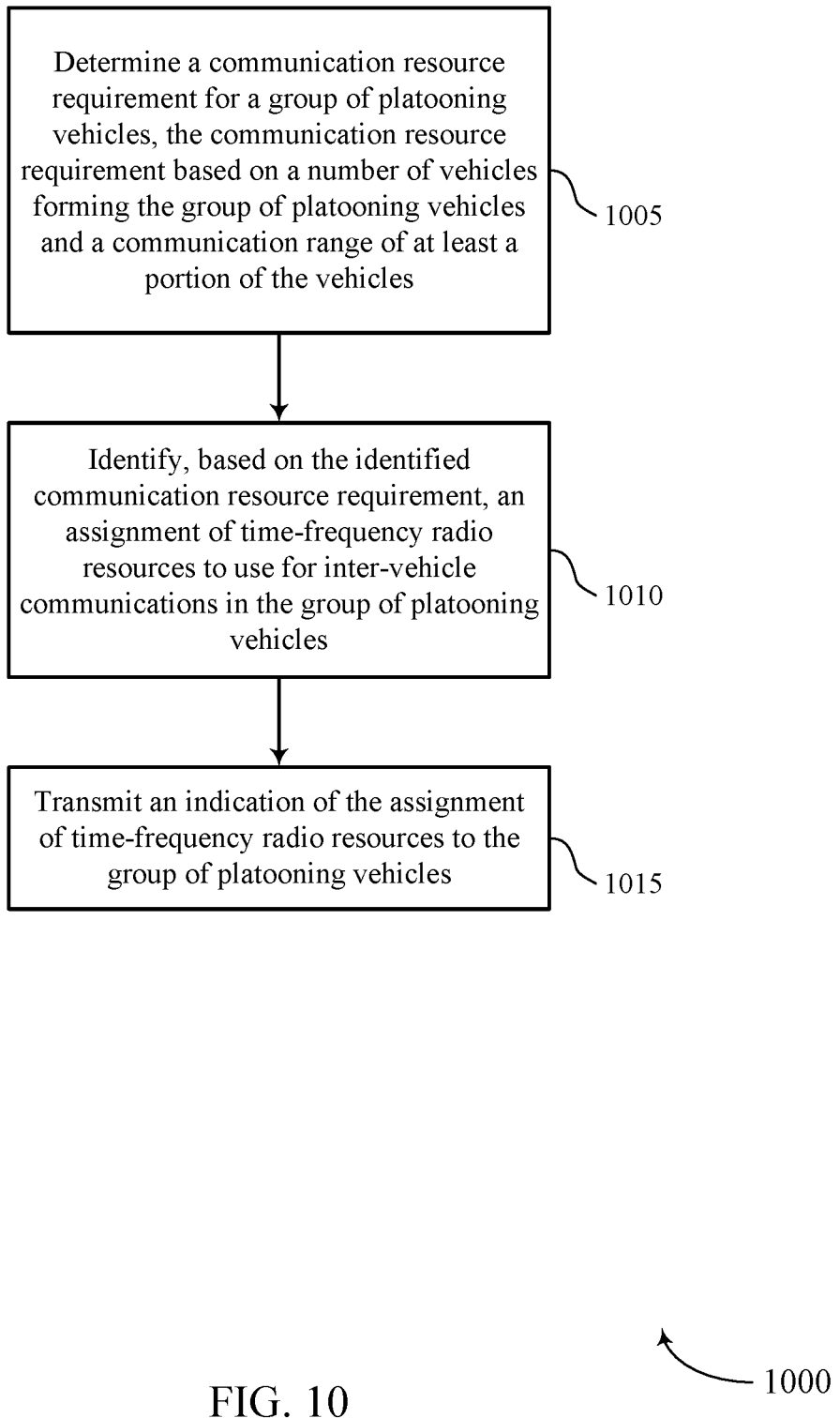
FIGS. 10 through 13 illustrate methods for methods to enable efficient intra-platoon communication, in accordance with one or more aspects of the present disclosure.

FIG. 10 shows a flowchart illustrating a method 1000 for methods to enable efficient intra-platoon communication, in accordance with one or more aspects of the present disclosure. The operations of method 1000 may be implemented by a UE 115 or its components as described herein. For example, the operations of method 1000 may be performed by a platooning communication manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1005 the UE 115 may determine a communication resource requirement for a group of platooning vehicles, the communication resource requirement based at least in part on a number of vehicles forming the group of platooning vehicles and a communication range of at least a portion of the vehicles. The operations of block 1005 may be performed according to the methods described with reference to FIGS. 1 through 5. In certain examples, aspects of the operations of block 1005 may be performed by a communication requirement manager as described with reference to FIGS. 6 through 9.

At block 1010 the UE 115 may identify, based at least in part on the identified communication resource requirement, an assignment of time-frequency radio resources to use for inter-vehicle communications in the group of platooning vehicles. The operations of block 1010 may be performed according to the methods described with reference to FIGS. 1 through 5. In certain examples, aspects of the operations of block 1010 may be performed by a resource identifier as described with reference to FIGS. 6 through 9.

At block 1015 the UE 115 may transmit an indication of the assignment of time-frequency radio resources to the group of platooning vehicles. The operations of block 1015 may be performed according to the methods described with reference to FIGS. 1 through 5. In certain examples, aspects of the operations of block 1015 may be performed by a resource assignment manager as described with reference to FIGS. 6 through 9.

Figure 11:
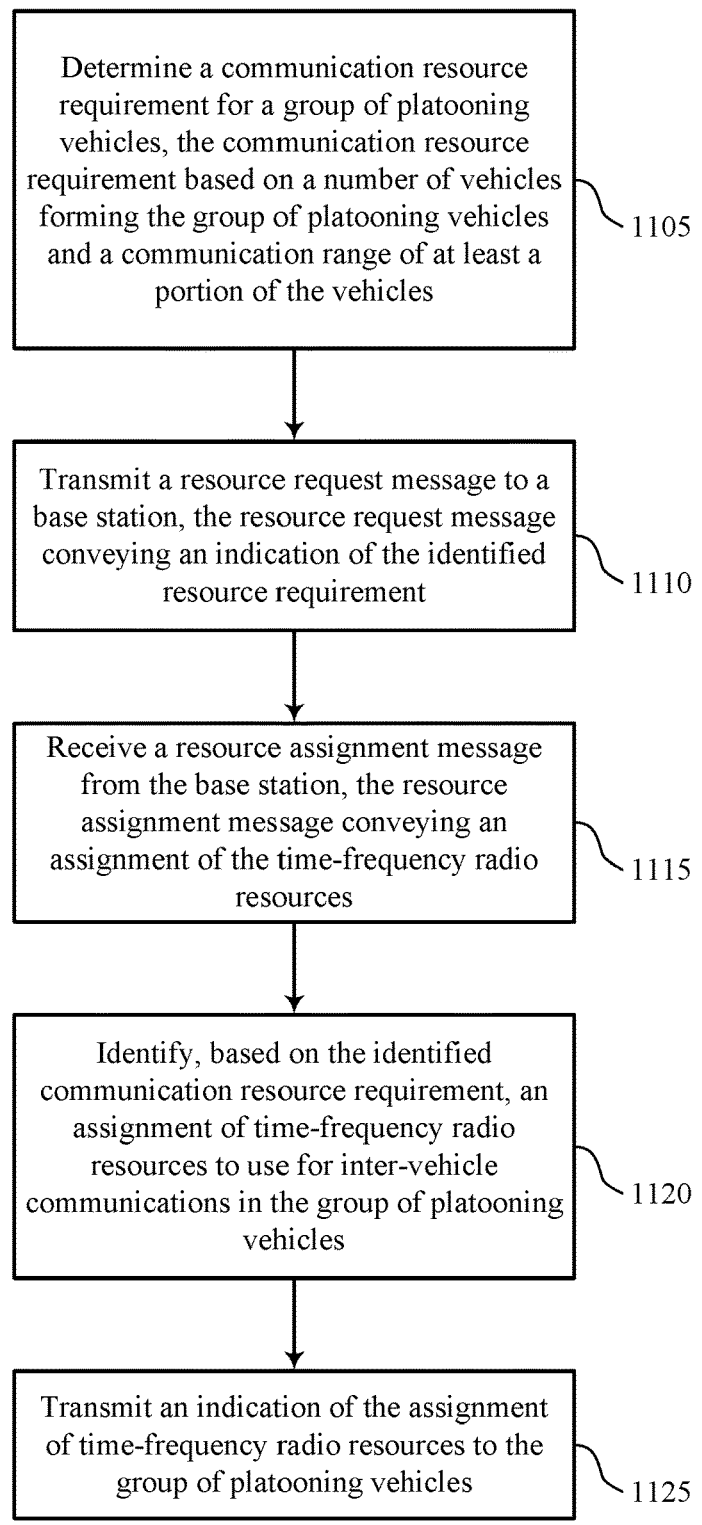

FIG. 11 shows a flowchart illustrating a method 1100 for methods to enable efficient intra-platoon communication, in accordance with one or more aspects of the present disclosure. The operations of method 1100 may be implemented by a UE 115 or its components as described herein. For example, the operations of method 1100 may be performed by a platooning communication manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may determine a communication resource requirement for a group of platooning vehicles, the communication resource requirement based at least in part on a number of vehicles forming the group of platooning vehicles and a communication range of at least a portion of the vehicles. The operations of block 1105 may be performed according to the methods described with reference to FIGS. 1 through 5. In certain examples, aspects of the operations of block 1105 may be performed by a communication requirement manager as described with reference to FIGS. 6 through 9.

At block 1110 the UE 115 may transmit a resource request message to a base station, the resource request message conveying an indication of the identified resource requirement. The operations of block 1110 may be performed according to the methods described with reference to FIGS. 1 through 5. In certain examples, aspects of the operations of block 1110 may be performed by a resource identifier as described with reference to FIGS. 6 through 9.

At block 1115 the UE 115 may receive a resource assignment message from the base station, the resource assignment message conveying an assignment of the time-frequency radio resources. The operations of block 1115 may be performed according to the methods described with reference to FIGS. 1 through 5. In certain examples, aspects of the operations of block 1115 may be performed by a resource identifier as described with reference to FIGS. 6 through 9.

At block 1120 the UE 115 may identify, based at least in part on the identified communication resource requirement, an assignment of time-frequency radio resources to use for inter-vehicle communications in the group of platooning vehicles. The operations of block 1120 may be performed according to the methods described with reference to FIGS. 1 through 5. In certain examples, aspects of the operations of block 1120 may be performed by a resource identifier as described with reference to FIGS. 6 through 9.

At block 1125 the UE 115 may transmit an indication of the assignment of time-frequency radio resources to the group of platooning vehicles. The operations of block 1125 may be performed according to the methods described with reference to FIGS. 1 through 5. In certain examples, aspects of the operations of block 1125 may be performed by a resource assignment manager as described with reference to FIGS. 6 through 9.

Figure 12:
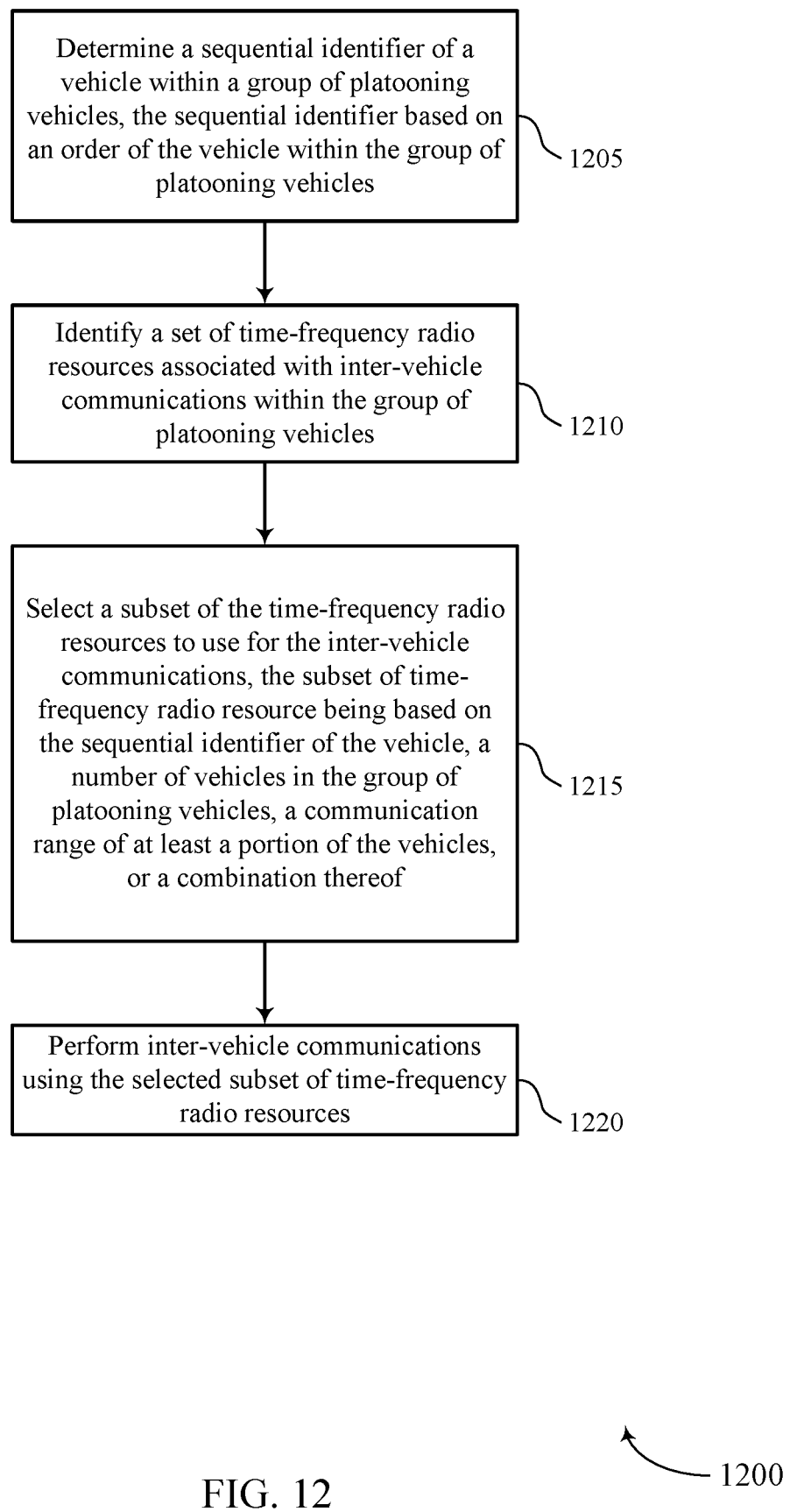

FIG. 12 shows a flowchart illustrating a method 1200 for methods to enable efficient intra-platoon communication, in accordance with one or more aspects of the present disclosure. The operations of method 1200 may be implemented by a UE 115 or its components as described herein. For example, the operations of method 1200 may be performed by a platooning communication manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may determine a sequential identifier of a vehicle within a group of platooning vehicles, the sequential identifier based on an order of the vehicle within the group of platooning vehicles. The operations of block 1205 may be performed according to the methods described with reference to FIGS. 1 through 5. In certain examples, aspects of the operations of block 1205 may be performed by a VID manager as described with reference to FIGS. 6 through 9.

At block 1210 the UE 115 may identify a set of time-frequency radio resources associated with inter-vehicle communications within the group of platooning vehicles. The operations of block 1210 may be performed according to the methods described with reference to FIGS. 1 through 5. In certain examples, aspects of the operations of block 1210 may be performed by a resource identifier as described with reference to FIGS. 6 through 9.

At block 1215 the UE 115 may select a subset of the time-frequency radio resources to use for the inter-vehicle communications, the subset of time-frequency radio resource being based at least in part on the sequential identifier of the vehicle, a number of vehicles in the group of platooning vehicles, a communication range of at least a portion of the vehicles, or a combination thereof. The operations of block 1215 may be performed according to the methods described with reference to FIGS. 1 through 5. In certain examples, aspects of the operations of block 1215 may be performed by a resource assignment manager as described with reference to FIGS. 6 through 9.

At block 1220 the UE 115 may perform inter-vehicle communications using the selected subset of time-frequency radio resources. The operations of block 1220 may be performed according to the methods described with reference to FIGS. 1 through 5. In certain examples, aspects of the operations of block 1220 may be performed by a resource assignment manager as described with reference to FIGS. 6 through 9.

Figure 13:
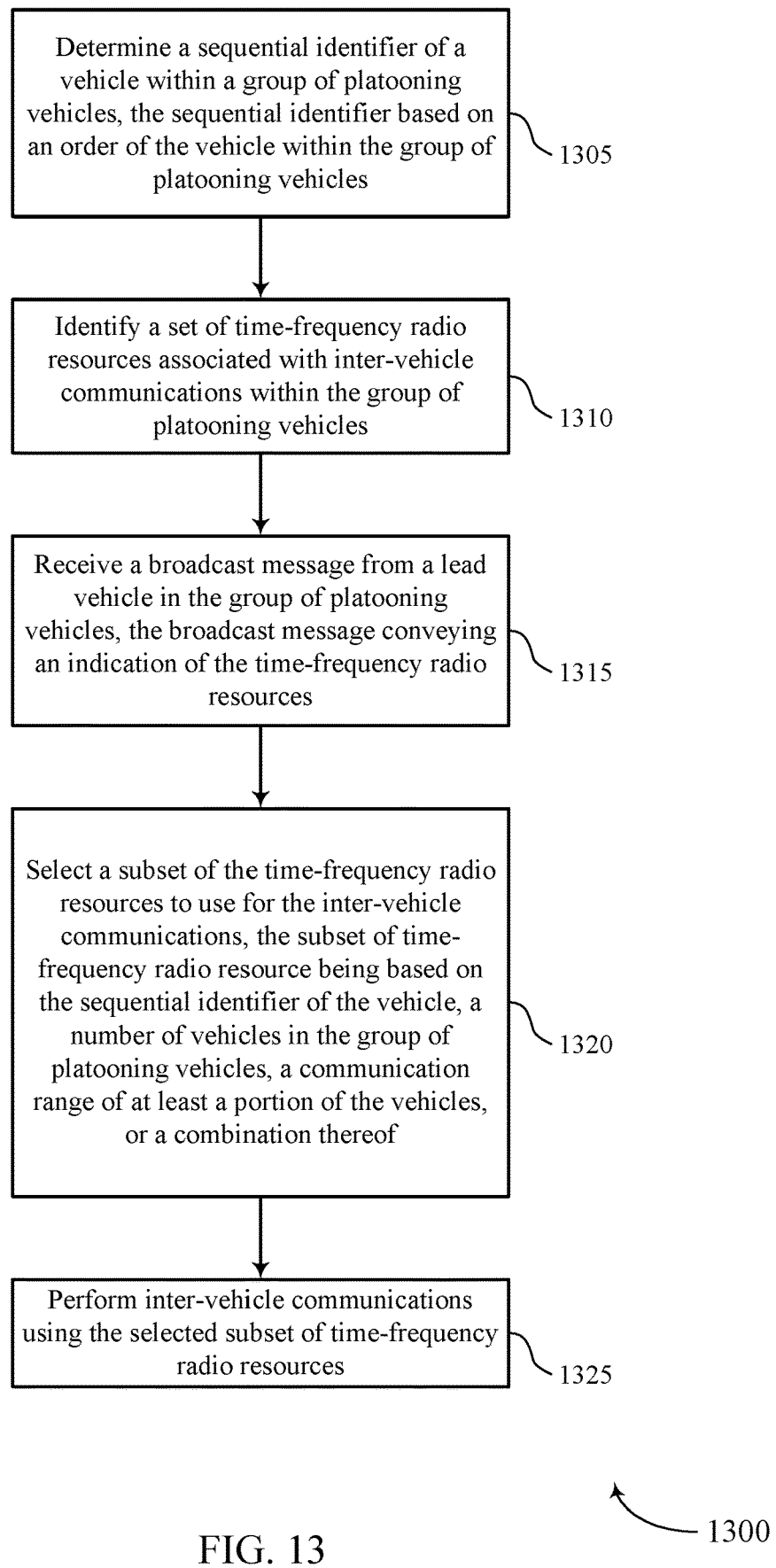

FIG. 13 shows a flowchart illustrating a method 1300 for methods to enable efficient intra-platoon communication, in accordance with one or more aspects of the present disclosure. The operations of method 1300 may be implemented by a UE 115 or its components as described herein. For example, the operations of method 1300 may be performed by a platooning communication manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may determine a sequential identifier of a vehicle within a group of platooning vehicles, the sequential identifier based on an order of the vehicle within the group of platooning vehicles. The operations of block 1305 may be performed according to the methods described with reference to FIGS. 1 through 5. In certain examples, aspects of the operations of block 1305 may be performed by a VID manager as described with reference to FIGS. 6 through 9.

At block 1310 the UE 115 may identify a set of time-frequency radio resources associated with inter-vehicle communications within the group of platooning vehicles. The operations of block 1310 may be performed according to the methods described with reference to FIGS. 1 through 5. In certain examples, aspects of the operations of block 1310 may be performed by a resource identifier as described with reference to FIGS. 6 through 9.

At block 1315 the UE 115 may receive a broadcast message from a lead vehicle in the group of platooning vehicles, the broadcast message conveying an indication of the time-frequency radio resources. The operations of block 1315 may be performed according to the methods described with reference to FIGS. 1 through 5. In certain examples, aspects of the operations of block 1315 may be performed by a resource identifier as described with reference to FIGS. 6 through 9.

At block 1320 the UE 115 may select a subset of the time-frequency radio resources to use for the inter-vehicle communications, the subset of time-frequency radio resource being based at least in part on the sequential identifier of the vehicle, a number of vehicles in the group of platooning vehicles, a communication range of at least a portion of the vehicles, or a combination thereof. The operations of block 1320 may be performed according to the methods described with reference to FIGS. 1 through 5. In certain examples, aspects of the operations of block 1320 may be performed by a resource assignment manager as described with reference to FIGS. 6 through 9.

At block 1325 the UE 115 may perform inter-vehicle communications using the selected subset of time-frequency radio resources. The operations of block 1325 may be performed according to the methods described with reference to FIGS. 1 through 5. In certain examples, aspects of the operations of block 1325 may be performed by a resource assignment manager as described with reference to FIGS. 6 through 9.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communication systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communication system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
determining a communication resource requirement for a group of platooning vehicles, the communication resource requirement based at least in part on a number of vehicles forming the group of platooning vehicles and a communication range of at least a portion of the vehicles;
assigning a sequential identifier to each vehicle in the group of platooning vehicles;
identifying, based at least in part on the identified communication resource requirement and the sequential identifiers, an assignment of time-frequency radio resources to use for inter-vehicle communications in the group of platooning vehicles; and
transmitting an indication of the assignment of time-frequency radio resources to the group of platooning vehicles.

2. The method of claim 1, further comprising:
determining a communication schedule for the group of platooning vehicles, the communication schedule comprising assigning at least a portion of the time-frequency radio resources to different vehicles; and
transmitting an indication of the communication schedule to the group of platooning vehicles.

3. The method of claim 2, further comprising:
obtaining communications, according to the communications schedule and using at least a portion of the assigned time-frequency radio resources, from the vehicles of the group of platooning vehicles.

4. The method of claim 1, further comprising:
assigning the sequential identifiers according to the order in which the vehicle is located within the group of platooning vehicles.

5. The method of claim 1, further comprising:
assigning, according to the sequential identifiers, a first subset of time-frequency radio resources to a first group of vehicles and a second subset of time-frequency radio resources to a second group of vehicles, the first subset of time-frequency radio resources being non-overlapping in time and are overlapping in frequency with respect to the second subset of time-frequency radio resources.

6. The method of claim 5, further comprising:
determining a number of frequency channels for the communication resource requirement based at least in part on the number of vehicles and the communication range of the portion of vehicles.

7. The method of claim 5, wherein:
the first group of vehicles are associated with odd numbered sequential identifier and the second group of vehicles are associated with even numbered sequential identifiers.

8. The method of claim 1, further comprising:
transmitting a resource request message to a base station, the resource request message conveying an indication of the identified resource requirement; and
receiving a resource assignment message from the base station, the resource assignment message conveying an assignment of the time-frequency radio resources.

9. The method of claim 1, further comprising:
identifying a pre-configured resource pool available to use in the group of platooning vehicles; and
selecting, from the pre-configured resource pool, the assignment of the time-frequency radio resources.

10. The method of claim 1, wherein:
the communication resource requirement is further based on a travel speed of the group of platooning vehicles, a distance between the vehicles in the group of platooning vehicles, a resource block size used for the inter-vehicles communications, or combinations thereof.

11. The method of claim 1, wherein:
the time-frequency radio resources comprise using a licensed radio frequency spectrum band, an unlicensed radio frequency spectrum band, or combinations thereof.

12. A method for wireless communication, comprising:
determining a sequential identifier of a vehicle within a group of platooning vehicles, the sequential identifier based on an order of the vehicle within the group of platooning vehicles;
identifying a set of time-frequency radio resources associated with inter-vehicle communications within the group of platooning vehicles;
selecting a subset of the time-frequency radio resources to use for the inter-vehicle communications, the subset of time-frequency radio resource being based at least in part on the sequential identifier of the vehicle, a number of vehicles in the group of platooning vehicles, a communication range of at least a portion of the vehicles, or a combination thereof; and performing inter-vehicle communications using the selected subset of time-frequency radio resources.

13. The method of claim 12, further comprising:
receiving a broadcast message from a lead vehicle in the group of platooning vehicles, the broadcast message conveying an indication of the time-frequency radio resources.

14. The method of claim 13, wherein:
the broadcast message further conveying an indication of the subset of time-frequency radio resources.

15. The method of claim 12, further comprising:
identifying a pre-configured resource pool available to use in the group of platooning vehicles; and
selecting, from the pre-configured resource pool and based on the sequential identifier, the subset of time-frequency radio resources.

16. The method of claim 12, further comprising:
determining the sequential identifier based at least in part on receiving the sequential identifier from a base station, or determining the sequential identifier based at least in part on information received from a lead vehicle of the group of platooning vehicles, or combinations thereof.

17. The method of claim 12, further comprising:
sharing the subset of time-frequency radio resources with at least one other vehicle, the sharing being based on a communication range of the other vehicle, a number of vehicles forming the group of platooning vehicles, a spacing between vehicles in the group of platooning vehicles, a travel speed of the group of platooning vehicles, or combinations thereof.

18. The method of claim 12, wherein:
the subset of time-frequency radio resources are time division multiplexed with time-frequency radio resources used for inter-vehicle communications by each vehicle located adjacent to the vehicle.

19. An apparatus for wireless communication, comprising:
a processor;
memory in electronic communication with the processor; and
instructions stored in the memory, the instructions being operable to cause the processor to:
determine a communication resource requirement for a group of platooning vehicles, the communication resource requirement based at least in part on a number of vehicles forming the group of platooning vehicles and a communication range of at least a portion of the vehicles;
assign a sequential identifier to each vehicle in the group of platooning vehicles;
identify, based at least in part on the identified communication resource requirement and the sequential identifiers, an assignment of time-frequency radio resources to use for inter-vehicle communications in the group of platooning vehicles; and
transmit an indication of the assignment of time-frequency radio resources to the group of platooning vehicles.

20. The apparatus of claim 19, wherein the instructions are further operable to cause the processor to:
determine a communication schedule for the group of platooning vehicles, the communication schedule comprising assigning at least a portion of the time-frequency radio resources to different vehicles; and
transmit an indication of the communication schedule to the group of platooning vehicles.

21. The apparatus of claim 20, wherein the instructions are further operable to cause the processor to:
obtain communications, according to the communications schedule and using at least a portion of the assigned time-frequency radio resources, from the vehicles of the group of platooning vehicles.

22. The apparatus of claim 19, wherein the instructions are further operable to cause the processor to:
assign the sequential identifiers according to the order in which the vehicle is located within the group of platooning vehicles.

23. The apparatus of claim 19, wherein the instructions are further operable to cause the processor to:
assign, according to the sequential identifiers, a first subset of time-frequency radio resources to a first group of vehicles and a second subset of time-frequency radio resources to a second group of vehicles, the first subset of time-frequency radio resources being non-overlapping in time and are overlapping in frequency with respect to the second subset of time-frequency radio resources.

24. The apparatus of claim 23, wherein the instructions are further operable to cause the processor to:
determine a number of frequency channels for the communication resource requirement based at least in part on the number of vehicles and the communication range of the portion of vehicles.

25. The apparatus of claim 23, wherein:
the first group of vehicles are associated with odd numbered sequential identifier and the second group of vehicles are associated with even numbered sequential identifiers.

26. The apparatus of claim 19, wherein the instructions are further operable to cause the processor to:
transmit a resource request message to a base station, the resource request message conveying an indication of the identified resource requirement; and
receive a resource assignment message from the base station, the resource assignment message conveying an assignment of the time-frequency radio resources.

27. The apparatus of claim 19, wherein the instructions are further operable to cause the processor to:
identify a pre-configured resource pool available to use in the group of platooning vehicles; and
select, from the pre-configured resource pool, the assignment of the time-frequency radio resources.

28. The apparatus of claim 19, wherein:
the communication resource requirement is further based on a travel speed of the group of platooning vehicles, a distance between the vehicles in the group of platooning vehicles, a resource block size used for the inter-vehicles communications, or combinations thereof.

29. An apparatus for wireless communication, comprising:
a processor;
memory in electronic communication with the processor; and
instructions stored in the memory, the instructions being operable to cause the processor to:
determine a sequential identifier of a vehicle within a group of platooning vehicles, the sequential identifier based on an order of the vehicle within the group of platooning vehicles;

identify a set of time-frequency radio resources associated with inter-vehicle communications within the group of platooning vehicles;

select a subset of the time-frequency radio resources to use for the inter-vehicle communications, the subset of time-frequency radio resource being based at least in part on the sequential identifier of the vehicle, a number of vehicles in the group of platooning vehicles, a communication range of at least a portion of the vehicles, or a combination thereof; and perform inter-vehicle communications using the selected subset of time-frequency radio resources.

30. The apparatus of claim 29, wherein the instructions are further operable to cause the processor to:

receive a broadcast message from a lead vehicle in the group of platooning vehicles, the broadcast message conveying an indication of the time-frequency radio resources.

\* \* \* \* \*